INVENTORS.
GEORGE P. KNAPP
MARVIN MEYER
WILLIAM P. ROBBINS
RAYMOND T. ZWACK
by Godfrey B. Spier
ATTORNEY.

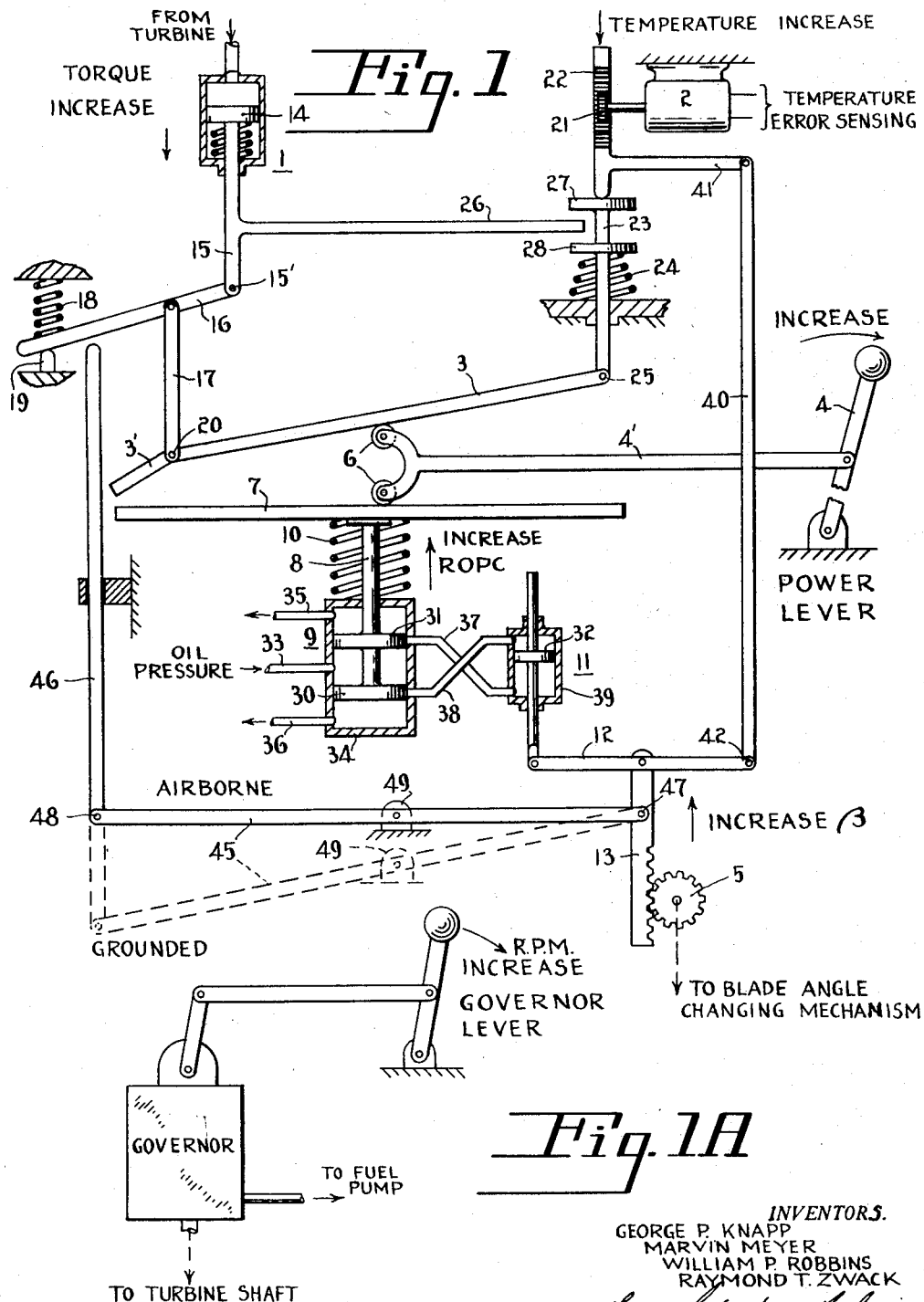

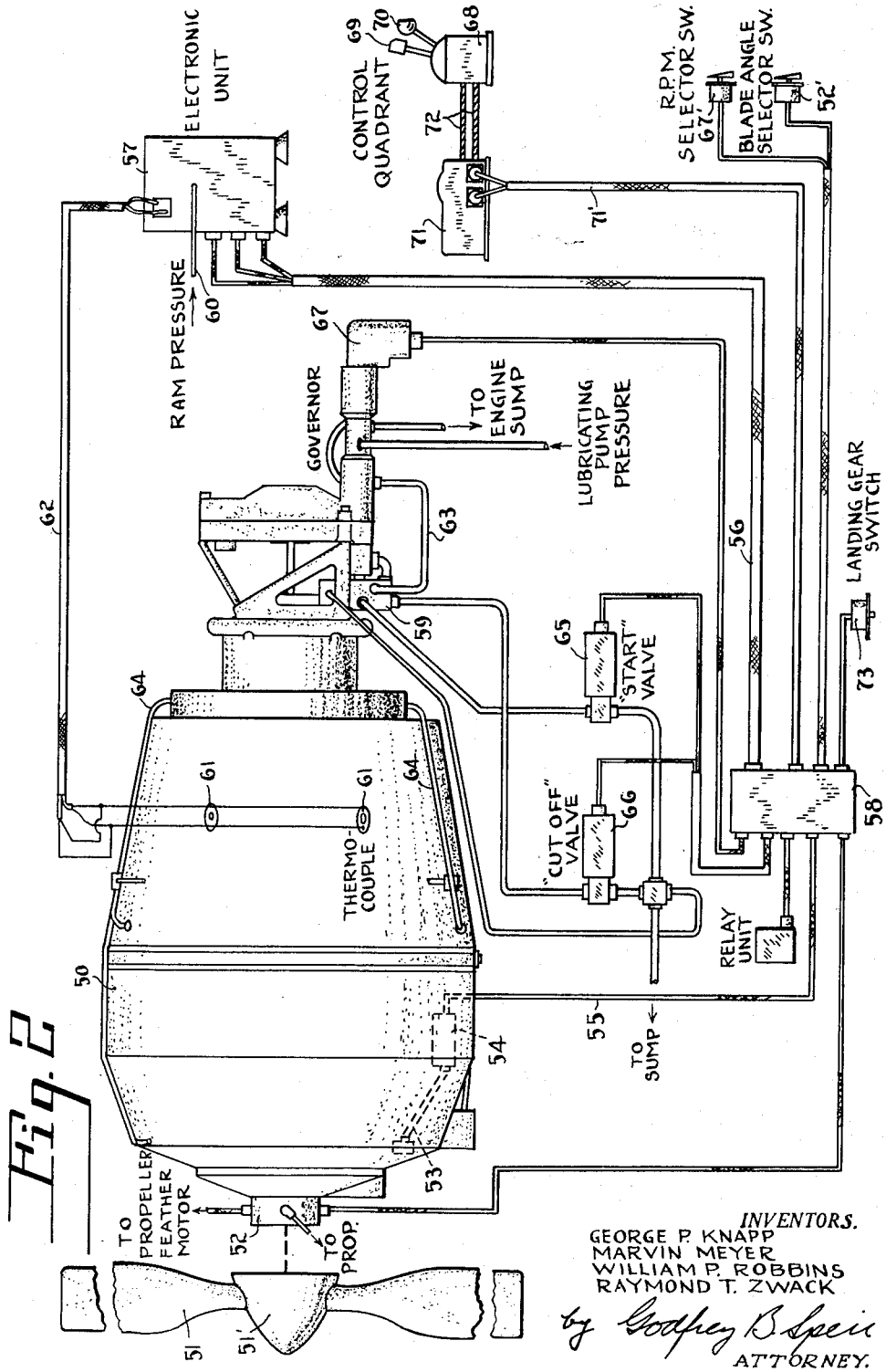

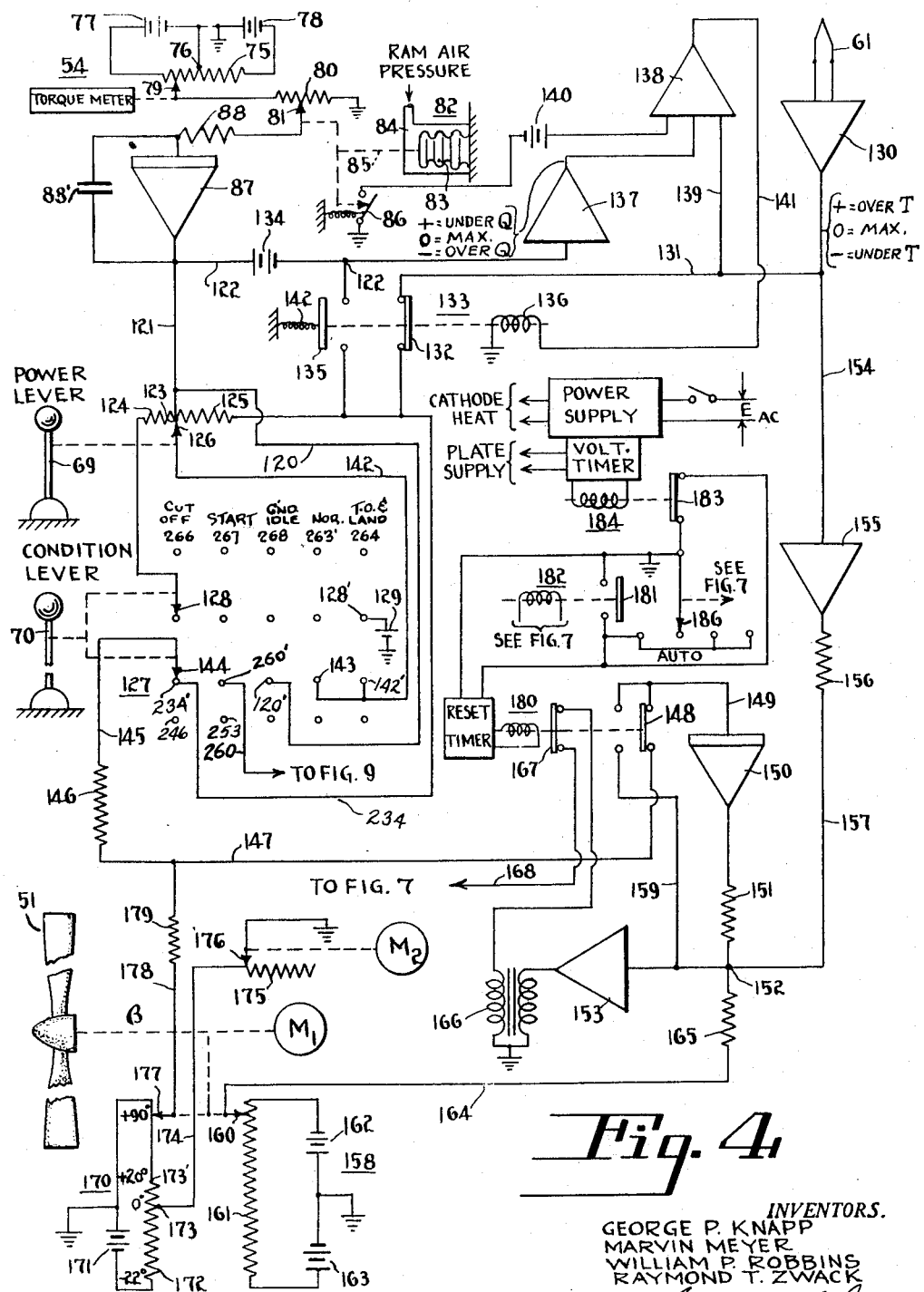

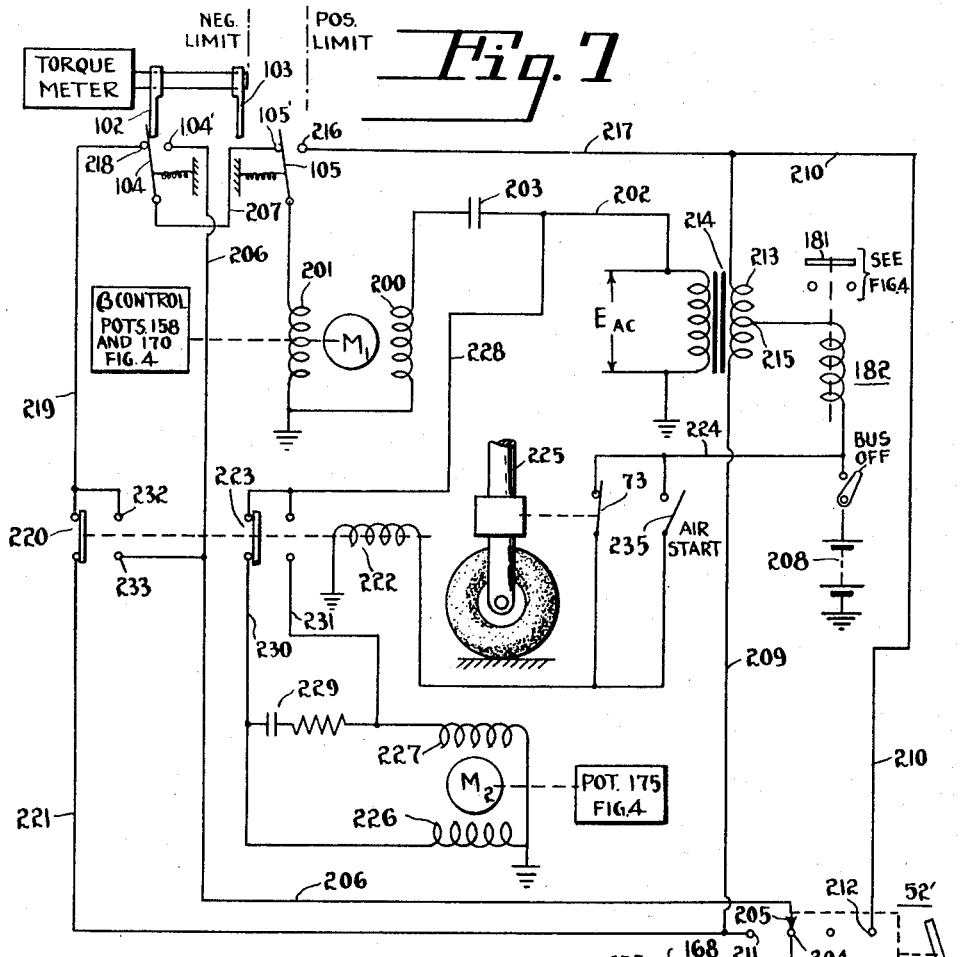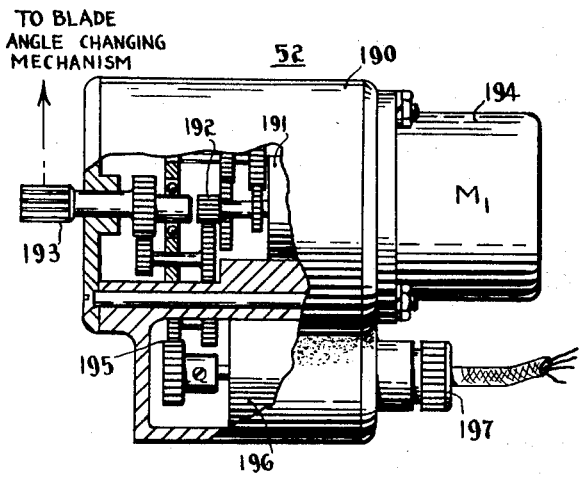

Oct. 25, 1960  G. P. KNAPP ET AL  2,957,655
TURBINE PROPELLER CONTROL SYSTEM
Original Filed June 1, 1950  8 Sheets-Sheet 7

POWER LEVER SETTING
TAKE OFF & LANDING

POWER LEVER SETTING
NORMAL OPERATION

INVENTORS.
GEORGE P. KNAPP
MARVIN MEYER
WILLIAM P. ROBBINS
RAYMOND T. ZWACK by Godfrey B. Spein
ATTORNEY.

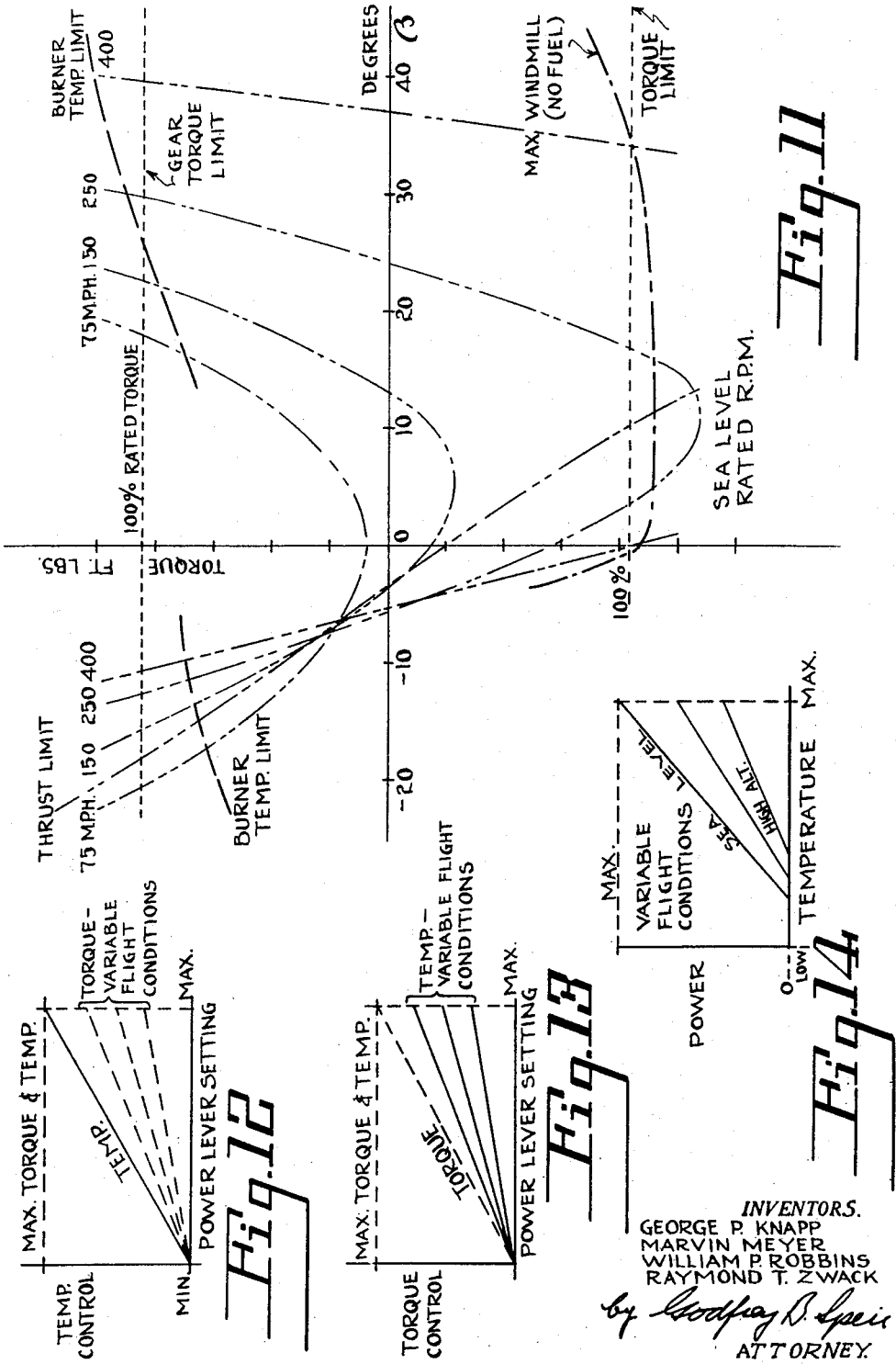

United States Patent Office 2,957,655
Patented Oct. 25, 1960

2,957,655

TURBINE PROPELLER CONTROL SYSTEM

George P. Knapp, Port Washington, and William P. Robbins, Westbury, N.Y., and Marvin Meyer and Raymond T. Zwack, West Caldwell, N.J., assignors to Curtiss-Wright Corporation, a corporation of Delaware Original application June 1, 1950, Ser. No. 165,548, now Patent No. 2,737,252, dated Mar. 6, 1956. Divided and this application June 27, 1955, Ser. No. 518,094

6 Claims. (Cl. 244—81)

This invention relates to prime mover and load control and particularly to a system and method for controlling within practical limits the operation of a turbine-propeller combination comprising essentially a gas turbine including a compressor, and a variable pitch propeller driven by the turbine. This is a division of application Serial Number 165,548 filed June 1, 1950, now Patent No. 2,737,252 issued March 6, 1956.

Control systems of this character are also disclosed and claimed in application Serial Number 694,398 filed August 31, 1946 by Kochenburger, et al. for "Turbine-Propeller Controls," issued as Patent No. 2,631,677 on March 17, 1953, and application Serial Number 40,476 filed July 24, 1948 by Knapp, et al. for "Turbine-Propeller Control System," issued as Patent No. 2,640,550 on June 2, 1953.

In this type of apparatus a gas driven turbine and an air compressor are usually mounted on a common operating shaft so that the turbine drives the compressor for delivering air in needed quantity to the turbine combustion chamber. Liquid fuel is admitted to the combustion chamber according to the load requirements as represented by a variable pitch propeller connected usually by means of reduction gearing to the turbine shaft. When used in aircraft during flight the compressor receives ambient air already boosted in pressure by ram action and delivers it at a pressure of several atmospheres to the combustion chamber in excess of combustion requirements, where part of it maintains combustion and the balance mixes with the highly heated products of combustion partially to cool the combustion gases.

This high temperature gas mixture constitutes the motive fluid which is directed under considerable pressure so as to operate the turbine according to either the impulse or reaction principle, and then vented through the turbine tailpipe to atmosphere. The temperature of the tailpipe gases or of the gases in the burners at predetermined or rated turbine r.p.m. is representative of turbine torque since for a given set of flight conditions the torque-tailpipe temperature relationship in a constant speed gas turbine is for practical purposes linear. The tailpipe temperature or combustion chamber temperature also represents the limit of permissible temperature for the turbine blades.

The term "turbine-temperature" as used herein and in the claims refers generally to the high temperature region of the operating turbine and may be either the temperature of the combustion gas upstream or downstream of the turbine wheel, the temperature of the buckets or blades of the turbine wheel, or the temperature of turbine parts in the region of the turbine wheel buckets. While the temperatures of these various elements may differ, they are all high, and they follow a predictable pattern relative to one another under operating conditions. Turbine wheel bucket temperature is the critical temperature, but since this is difficult to measure, an adjacent temperature may be utilized allowing for the drop or increase between the bucket temperature and the temperature of the specific zone or element which is measured.

For practical reasons the control of both the turbine and propeller pitch changing mechanism should be automatic under normal operating conditions subject to preset governor control and a power control operable by the pilot. For obtaining stable and precise automatic control, it has previously been proposed to control turbo-propeller combinations in various coordinated ways, for example by varying the fuel input in accordance with turbine temperature and also by varying propeller pitch according to the conjoint operation of the turbine governor and a manually controlled device representing power setting. Many of these prior art systems have serious disadvantages due, for example, to time lag in temperature control and to insufficient or improper coordination of the various control factors tending to cause sluggish response, or "over-shooting" resulting in unstable operation.

According to an aspect of the invention, when the aircraft is airborne the blade angle is controlled (subject in certain instances to an over-riding control) solely in response to temperature sensing when the pilot calls for maximum power; solely in response to actual turbine shaft torque when minimum power is called for; and jointly in response to both torque and temperature sensing for intermediate power demands, the respective torque and temperature controls blending in proportions according to the power-demand gradation between maximum and minimum power limits.

Other features of the invention include anticipatory torque over-ride control for protecting the turbine under certain flight conditions when permissible turbine temperature represents excessive torque; change-over of the control regime at zero power from torque control to blade angle control for obtaining more precise and positive control of blade angle; variation of the reference blade angle when weight is on the landing gear of the aircraft in order to compensate for propeller torque characteristics at low airspeed; and various means associated with the above described system for obtaining safe and efficient operation.

Another object of the invention is to provide means for obtaining improved operation under low airspeed or low power conditions, including control of propeller thrust at low power with means for obtaining substantially zero thrust; selective reverse pitch with controlled reverse thrust for aerodynamic braking at landing airspeeds; feathering and means for obtaining the minimum torque angle during starting.

Another object of the invention is to provide improved means for automatically expanding or contracting without discontinuity the power calibration of the pilot's power lever according to the existing flight conditions so that maximum power can be realized without exceeding the turbine temperature limit, and so that the mechanical torque limits of the turbine are not exceeded.

The invention will be more fully set forth in the following description referring to the accompanying drawings, and the features of novelty which characterize the invention will be pointed out with particularity in the claims annexed to and forming a part of the specification.

Fig. 1 is a schematic illustration of a mechanical representation of the basic principles involved in the present invention;

Fig. 1a is a similar view of the turbine governor control;

Fig. 2 is a layout diagram of basic structural components and connections of the turbine-propeller control system embodying the invention;

Fig. 3 is a view partly in section illustrating the pilot's control quadrant;

Fig. 4 is a circuit diagram illustrating generally the automatic control system for utilizing turbine power;

Fig. 7 is a circuit diagram illustrating the control for the blade angle power actuator motor;

Figure 16:
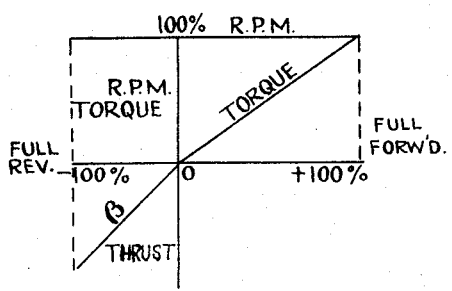
Figure 15:
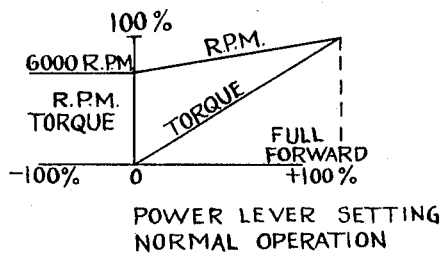

Fig. 11 graphically illustrates propeller torque characteristics and various operating limits for different air speeds and blade angles;

Figs. 12 and 13 graphically illustrate power lever control of temperature and torque individually;

Fig. 14 graphically illustrates turbine power and temperature relationships; and Figs. 15 and 16 graphically illustrate turbine-propeller operating schedules.

For an explanation of the invention claimed herein, description is omitted with respect to some parts of the drawings. A full description thereof appears in the parent case of which this is a division.

The complete control system, in addition to the basic control method used, necessarily incorporates certain auxiliary features for facilitating efficient and simple handling of the power plant. One requisite is the ability of the control to obtain essentially zero thrust at the minimum power position of the power lever. Since the burner temperature at which zero thrust is obtained varies between wide limits with varying flight conditions, it is necessary to use some other means than temperature control to obtain proper control of zero thrust.

At relatively high air speeds, the blade angle at which zero thrust is obtained corresponds closely with the blade angle which results in zero shaft torque. Torque control can therefore be used in the low or zero power position of the power lever at high air speeds.

For the purposes of clearly illustrating the basic principles of operation, reference is had to Fig. 1 which illustrates a mechanical analogue of a control system embodying essentially the present invention. The turbine shaft torque is represented by the indication of torquemeter 1 and the turbine burner temperature by the indication of servo motor 2. The torquemeter and temperature servo are interconnected respectively by linkages to a floating cam bar 3, the elevation and slope of which determine in combination with the pilot-controlled power lever 4 the character of the propeller control represented by the pinion gear 5. The power lever is connected to a link 4' carrying a pair of spaced cam follower rollers 6 adapted to bear respectively on the cam bar 3 and a horizontally positioned control bar 7. The bar 7 which is connected by a vertically guided stem 8 to a fluid servo control valve 9 is biased upwardly by spring 10 so as always to be in following engagement with the lower roller 6 of the power lever control.

Consequently, as the power lever is shifted to the right representing high power, or toward the left representing low power (assuming that the elevation and slope of the bar 3 remain as shown), the valve control bar 7 is raised by its spring or depressed by a cam action, as the case may be, to change the position of the servo valve 9.

This valve controls the fluid pressure servo 11 which, in turn, through a suitable link 12 and rack 13, operates the pinion 5 to cause increase or decrease in blade angle as indicated by the direction arrow.

The elevation and slope of the cam bar 3 are controlled according to either turbine torque or turbine burner temperature, or both, in the following manner: The torquemeter 1 which comprises a piston 14 that is spring biased in opposition to oil pressure from the turbine torque sensing means is connected to the low-power side of the bar 3 through a piston rod 15 and links 16 and 17. The link 16 is connected at one end to the piston rod 15 at the pivot 15' and, except in certain cases hereinafter described, is held at its opposite end by a spring 18 against a fixed abutment on fulcrum 19. The link 17 is connected to link 16 at an intermediate point and to the bar 3 at a pivot point 20. The cam bar 3 to the left of this point is bent so as to form a cam portion 3' that is steeper in slope than the bar proper for a purpose hereinafter described.

Accordingly, change in position of the torquemeter piston tends to raise or lower the pivot 20 on the bar 3 thereby affecting the servo valve control of blade angle. In a similar manner change in position of the temperature servo motor 2 which is made responsive in any suitable manner to change in turbine burner temperature, is translated to the opposite or high-power end of the bar 3 by means of motor pinion gear 21, rack 22 and a vertically guided rod 23 that is spring biased at 24 into abutting engagement with the rack 22.

The rod 23 is pivotally connected at 25 to the right end of bar 3 so that rotation of pinion 21 in response to burner temperature change causes the pivot 25 to be raised or lowered. For fixed values of turbine torque or turbine temperature the respective pivot point 20 or 25 can ordinarily be considered as being stationary, subject only to over-ride controls hereinafter described.

A torque over-ride or interlock between the torque and temperature controls is required since the mechanical strength of the propeller reduction gearing, rather than the turbine temperature constitutes the torque limit. This over-ride control may comprise for example a lateral extension 26 of the torque piston rod 15 positioned above a shoulder 28 on the rod 23. The upper shoulder 27 simply forms an abutment for the rack 22 and is spaced above the extension 26 so as not to be engaged therewith. Accordingly, excessive turbine torque represented by a pre-determined depressed position of piston 14 causes the rod 23, and hence pivot 25, to be likewise depressed so as to lower the valve pistons 30 and 31 of the servo valve 9 and thereby cause the piston 32 of the servo 11 also to be lowered for decreasing the blade angle. The turbine torque is thus decreased and the torquemeter piston 14 is again biased upwardly so that the servo valve 9 can reclose. The extension 26 remains in following engagement with shoulder 28 for retaining torque control as long as torque is the limiting factor.

If at low torque the torque increases more than the temperature increases, the rod 23 is engaged and moved by extension 26 away from rack 22 so that the control is entirely on torque.

Thus the blade angle control is transferred in this manner entirely to torque control whenever torque increases to a comparable value greater than the temperature value thereby anticipating excessive torque. In other words, when the torquemeter takes over control at the high power end, it retains control as long as the possibility of reaching maximum torque before maximum temperature exists.

The fluid pressure servo system is shown as of conventional type. The servo valve 9 is supplied with oil under pressure from a line 33 at a point between the valves 30 and 31. The valve cylinder 34 is vented at opposite ends by lines 35 and 36 to sump and is connected by passages 37 and 38 to opposite ends respectively of the servo cylinder 39. As shown, lowering of the servo valve piston 30 in the direction of decreased ROPC (rate of pitch control) below the inlet port of passage 38 admits oil pressure to the upper side of servo piston 32 so as to lower the piston, and consequently the rack 13, in a direction to decrease blade angle; and raising of the servo valve piston 31 in the direction of increased ROPC above the opening of passage 37 admits oil pressure to the lower side of the servo piston to increase blade angle. It may be assumed for the present that the right end pivot 42 of link 12 is fixed so that the rack 13 follows the movement of the servo piston 32.

It will now be apparent that when the power lever is shifted to the extreme high or maximum power position with one follower roller 6 directly beneath the pivot 25, the control transmitted to the servo valve 9 is wholly in response to turbine temperature when temperature is the limiting factor or in response to torque when torque is the limiting factor; and that when the power lever is shifted to the zero power position represented by pivot 20 the control transmitted to the servo valve is wholly in response to torque except as over-ridden by the pitch indicator linkage presently described; and, consequently, that intermediate positions of the power lever represent joint torque and temperature control in respective proportions according to the effective lever arms involved. In other words, the system is wholly or predominantly responsive to temperature control at maximum or high-power requirements, that is, when turbine temperature is the limiting factor, and is wholly or predominantly responsive to torque control at zero or low-power requirements when the turbine temperature is not a critical factor but is nevertheless unsuitable for control purposes in this range as will be seen from Fig. 14. Thus the full range of the power lever stroke is always effective and no discontinuity of control is encountered.

The temperature responsive control utilizes the integrated temperature indicated error signal in combination with the non-integrated indicated temperature signal for obtaining the equivalent of instantaneous temperature response. In the control system so far described the fluid pressure servo system 9, 11, functions as integrating means for the temperature signal, the integral output corresponding to the factor $$N_T \int (\Delta T_{BD} - T_1)_{dt}$$

The integrating operation will be apparent from the following analysis: The vertical motion of the left end, for example, of cam bar 3 is proportional to torque error. Assuming a fixed set position of the power lever, the servo control valve 9 representing ROPC is moved a corresponding amount in response to torque error to operate the servo 11 which is in effect a rate integrating device, so that the position of the servo piston 32 is proportional to the time integral of the deflection of valve 9.

The purpose of lessening the above factor by the factor $$T_T N_T \Delta T_1$$

representing the non-integrated component of temperature signal in order to stabilize the control and provide an effectively lag-free temperature indication from a slowly responding thermocouple, the out-put of servo 11 is modified by a differential connection with the temperature responsive device 2. This is represented by a link 40 pivotally connected at its upper end to an extension 41 of the rack 22 and at its lower end to the pivot point 42 of the differential link 12. Thus, movement of the pivot 42 due to change in the temperature signal is effective to add to or diminish by corresponding amount the output of integrating servo 11, the resultant control quantity being represented by the travel of rack 13. It is herein assumed that the opposite ends of the differential link 12 are positively positioned so that resultant control signals are transmitted directly to the rack 13 for control of the blade angle changing mechanism. The foregoing mechanism wherein the integrated and non-integrated components of the signals are combined provides stability in the system. An electrical system is shown in Fig. 4 wherein the same stable combination of integrated and non-integrated signals is utilized.

The operation of the blade angle control in conjunction with the turbine governor and fuel control, Fig. 1a, will be explained for the maximum and zero positions of the power lever. If the power lever, Fig. 1, is suddenly moved to the full power position, the cam follower 6 will be directly under the right end of the cam bar 3 so that it is responsive only to vertical movement of the temperature control at this end of the cam. In moving toward the right, the follower has an upward component of motion which, through the action of servo valve 9, admits oil pressure to the lower section of servo 11 to cause increase in blade angle. This throws a greater load on the turbine so that the governor in its action to prevent decrease of turbine r.p.m. applies more fuel, thereby causing an increase in burner temperature. This temperature increase results in motion of the temperature error indicator (rack 22) downward until the valve 9 is reclosed and the servo 11 deenergized. At this point, the temperature has reached the maximum desired value and the change in blade angle is complete.

Assuming now that the power lever is suddenly moved to the zero power position, the follower is now under the pivot 20 on the cam bar and subject to torque control. Because of the downward component of motion of the follower, the blade angle decreases and consequently torque also decreases, resulting in upward motion of the torquemeter piston 14 and associated linkages. When torque error reaches zero, which condition corresponds to zero torque, blade angle ceases to change. During this decrease in blade angle, turbine load is gradually decreased so that the turbine tends to speed up, such action being prevented by the governor which reduces the fuel supply to meet the reduced load conditions. As previously pointed out, turbine temperature under reduced load is sufficiently low to relinquish temperature control, at least in part, in favor of torque control.

The above control so far described is adapted for cruising or relatively high air speeds of the aircraft and tends to become ineffective at low air speeds in the landing range. This is because at relatively high air speeds the blade angle at which zero thrust is obtained corresponds closely with the blade angle which results in zero shaft torque, whereas at low air speeds torque control for obtaining zero thrust is unsatisfactory because of the reversal in sense which occurs in the characteristic curve of propeller torque versus blade angle, Fig. 11. That is, at low air speeds, the propeller torque may increase positively while the blade angle is decreasing so that pure torque control under such conditions would cause the propeller to run into complete reverse pitch notwithstanding a zero power setting of the power lever. In order to prevent such "running away" of the control, the torque control is over-ridden and the control at low power and air speed becomes one of the blade angle follow-up type. The blade angle follow-up mechanism is adjusted so that when the blade angle decreases to a certain point, for example 20 degrees, the blade angle follow-up control takes over. This type of control is also effective for applying aero-dynamic braking upon landing according to the position of the power lever in the reverse thrust region represented by the cam bar section 3′.

Referring again to Fig. 1, the blade angle follow-up control is represented by a linkage 45, 46 interconnecting the rack 13 and the torquemeter linkage 16, 17 and arranged so that when the rack is lowered below a certain point representing a given value of blade angle, the pivot 20 of the cam bar is lifted with consequent following movement of the servo valve 9. This, in turn, calls for increase in blade angle and thus counteracts the torque signal for decrease in blade angle. Specifically, the link 45 is pivotally connected at one end to the rack at 47 and at its opposite end to a vertically guided link 46 at 48. The link 45 is pivotally mounted at an intermediate point on a fulcrum 49 that remains fixed in the position indicated in solid lines when the aircraft is airborne. The upper end of link 46 is arranged to abut the link 16 in accordance with clockwise rotation of link 45 in response to decreasing blade angle below the aforesaid blade angle reference value. Accordingly, when the link 46 is raised still further, the link 16 is also rotated clockwise, thereby raising the pivot 20 and consequently causing upward movement of the servo valve pistons 30 and 31 to call for blade angle increase.

Thus, where the power lever is set for zero power below an air speed at which the desired zero thrust can be maintained by means of torque control, control of blade angle by the torquemeter is overridden at the predetermined minimum value of blade angle so that accidental blade reversal is precluded when the aircraft is airborne.

When the aircraft touches the runway, however, and airspeed decreases rapidly, it is desirable to allow blade angle to decrease materially since the blade angle at which zero thrust is obtained decreases with decreasing airspeed. Accordingly, the blade angle reference value is shifted to a lower value when the aircraft touches ground by suitable means associated within the landing gear. As indicated in Fig. 1, the fulcrum 49 is lowered to a new position shown by dotted lines so that the linkage 45, 46 is now ineffective to check decrease of blade angle until a new reference angle, namely, zero or flat pitch, is reached. In order to insure gradual decrease of blade angle as the aircraft slows down, the fulcrum 49 is lowered gradually, for example, through reduction gearing operable by a motor responsive to weight on the landing gear, so that the total shift to the "weight-on-wheels" position takes about ten seconds. The fulcrum is restored by similar means to its original position shown when the aircraft is again airborne.

Summarizing, since torque control down to zero torque is satisfactory as long as the aircraft has sufficient airspeed, Fig. 11, positioning the power lever for zero power produces essentially zero thrust until the airspeed is reduced to about approach speeds. At this reduced airspeed, the blade angle is limited to an arbitrary minimum reference value by pitch indicator means so that torque is held close to zero and the blade angle control is stabilized. From the moment of touchdown, the reference blade angle is gradually shifted from the aforesaid minimum reference value toward flat pitch. If the power lever remains at zero, some reverse thrust may gradually be applied by the propeller due to the relationship of blade angle and ground speed. As the aircraft slows down to a stop, the reverse thrust disappears since the propeller is at the static zero thrust angle. If the aircraft comes to a stop within the same time required for the reference blade angle to shift to zero pitch after touchdown, the propeller will function at substantially zero net thrust throughout the deceleration or braking operation.

Reverse thrust may be applied at any time when the aircraft is on the ground by further motion of the power lever from zero position to the left so that the cam follower 6 rides down the fixed slope of the cam bar portion 3' to depress the servo valve 9. This causes blade angle equilibrium to be obtained at an angle lower than that obtained at a zero power position. The amount of reverse thrust obtained is thus proportional to the distance that the power lever is moved into the reverse thrust control regime. By this means, rapid changes of thrust in either the positive or negative direction may be obtained at the will of the pilot regardless of the value of the basic reference angle.

The operation of "feathering" for this type of control is accomplished simply by setting the power lever for some positive amount of power and cutting off the fuel supply to the turbine. If essentially full power is called for, the propeller will then be feathered at the maximum permissible rate, i.e., the rate which results in maximum permissible reduction-gear torque.

Fig. 2 illustrates in lay-out form the principal structural parts and associated electrical mechanical and hydraulic connections in a practical embodiment of the invention. The gas turbine is indicated at 50, and since the invention is not dependent on a specific type of gas turbine, the working parts thereof are not illustrated. The turbine shaft drives through suitable reduction gearing (not shown) a variable pitch propeller 51 of well-known type having pitch changing mechanism housed within the spinner 51', the pitch changing mechanism in turn being suitably controlled in well-known manner by a propeller actuator motor or servo unit 52. Manual blade angle control of the propeller by the pilot is accomplished by a blade angle selector switch indicated at 52'. The turbine is provided with conventional torque sensing means of the hydraulic type (not shown) connected by line 53 to a torque meter pick-up unit 54 that in turn is electrically connected by cables 55 and 56 and junction box 58 to electronic control apparatus in the unit 57. The electronic unit is also connected to a source of ram air pressure through a pipe 60, the intake of which is suitably located within the turbine at the up-stream side of the compressor. Within the turbine combustion space are a plurality of circumferentially spaced thermocouples, the external connections of which are indicated at 61. The thermocouples which are electrically connected in parallel for sensing burner temperature for both normal and emergency control are connected to the electronic unit 57 by cable 62.

The governor per se can be of conventional design and is preferably of the so-called "droop" stabilized type having the equivalent of acceleration sensitivity. The governor is generally indicated as mounted at the rear of the turbine for connection to the rotating element of the turbine in the usual manner. The governor r.p.m. setting is effected by means of an actuator motor unit 67 electrically connected through cables as indicated to an r.p.m. selector switch 67' operable by the pilot.

A fuel pump servo indicated at 59 is controlled by the governor through a fluid connection 63 and it controls in turn a fuel pump of conventional type (not shown) which supplies fuel through lines 64, partly shown, to the turbine combustion space. The fuel servo is subject to additional controls for "start" and "cut-off" conditions involving solenoid-operated valves 65 and 66 which are arranged as indicated to vent under certain conditions the fuel servo to low pressure or "sump," thereby precluding or limiting operation of the fuel pump. The solenoid operating means is in turn electrically connected through the junction box 58 to appropriate control switches in the pilot controlled switching unit 71. This unit is under the direct control of the pilot through the control quadrant 68 having a pair of operating levers 69 and 70 representing the power requirements and the condition schedule respectively. The power and condition levers are mechanically connected through "teleflex" cables 72 or the like to the switching unit 71. This switching unit which is electrically connected by cable 71' through the junction box 58 to the electronic unit and to other parts of the electrical system constitutes the primary means through which the pilot controls the turbine propeller system.

The control lever system used in the present invention follows the principle of the so-called "unilever" control system proposed by the Armed Forces. In the present case, turbine power and r.p.m. are both controlled primarily by a single quadrant lever, namely the "power lever" according to a predetermined schedule that varies with different conditions associated with the grounded and airborne status of the aircraft. A second control lever, namely the "condition lever" has in the present form five positions for establishing particular relationships between power, r.p.m. and power lever positions for the respective ground and airborne conditions. This interrelation of power and condition controls will permit the power lever itself to be moved to any desired position regardless of the condition lever, but the power actually obtained will remain at the values or within the ranges herein indicated.

A landing gear switch indicated at 73 is connected to the electrical system and is suitably operated in response to weight on the landing gear as previously indicated for the purpose of changing the blade angle reference value when the blade angle follow-up control is to be used during landing.

*Electrical control system*

In the following description of the electrical control system illustrated by Figs. 4 to 10, it should be noted that for reference purposes the turbine is represented as shut down and the voltage supply bus de-energized. Thus all relays are shown de-energized and the D.C. source disconnected.

Referring now to Fig. 4 which diagrammatically illustrates in part an electrical system constituting a preferred form of the invention, the torquemeter pick-up unit 54 comprises a potentiometer 75 connected to two sources of D.C. voltage 77 and 78 divided by a grounded intermediate tap 76. Accordingly, the co-acting potentiometer contact 79 that is operable by the torquemeter is effective to pick off either positive or negative voltages, depending on the representation of turbine torque. Thus, when the slider contact 79 is at the extreme right indicating high positive torque, the voltage derived at that point is a maximum negative value and conversely, when the contact is at the extreme left representing maximum negative torque, the voltage derived at that point is the maximum positive value, the derived voltage of course at the grounded tap 76 (representing zero torque) being zero.

This derived voltage, however, can represent torque only for a given flight condition so that suitable biasing means are provided to compensate for different flight conditions as hereinafter described in connection with the operation of the system. In general, the derived voltage from contact 79 energizes a second potentiometer or voltage divider 80, the opposite terminal of which is grounded. The potentiometer contact 81 is operable as indicated by a biasing device 82 subject to absolute ram air pressure. In order to operate the slider contact 81 according to absolute ram pressure an evacuated and sealed metallic bellows 83 is enclosed within a casing 84 that receives an indicated ram pressure from the turbine. The free end of the metallic bellows is mechanically connected at 85 to the contact 81 and also to a limit switch 86 for a purpose hereinafter described. It will, therefore, be seen that the potentiometer contact 81 is operated according to the joint effects of ram pressure and altitude, the former depending on both airspeed and air density. The voltage derived at contact 81 therefore represents a torque value modified according to existing flight conditions for the purpose of maintaining torque sensitivity equal to temperature sensitivity. The input to the amplifier 87 is through a resistor 88, the amplifier end of which is connected through a capacitor 88' to the amplifier output. The value of the capacitor 88' is chosen to give the desired time constant. The resistor and capacitor together form an RC time delay network in the feedback from the amplifier output to its input, providing a time delay in the output voltage substantially equal to the time delay characteristic of the thermocouples. In other words, a change in torquemeter voltage at the output of the amplifier 87 is delayed so as to match the delay in the thermocouple signal as described under "operation."

Figure 5:
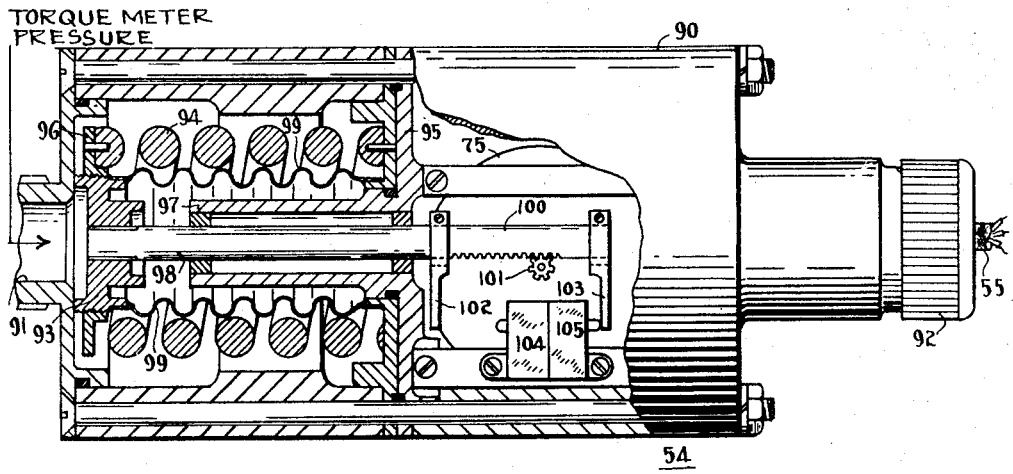
Fig. 5 is a view partly in section illustrating the torque meter pick-up device used in the circuit of Fig. 4.
Figure 6:
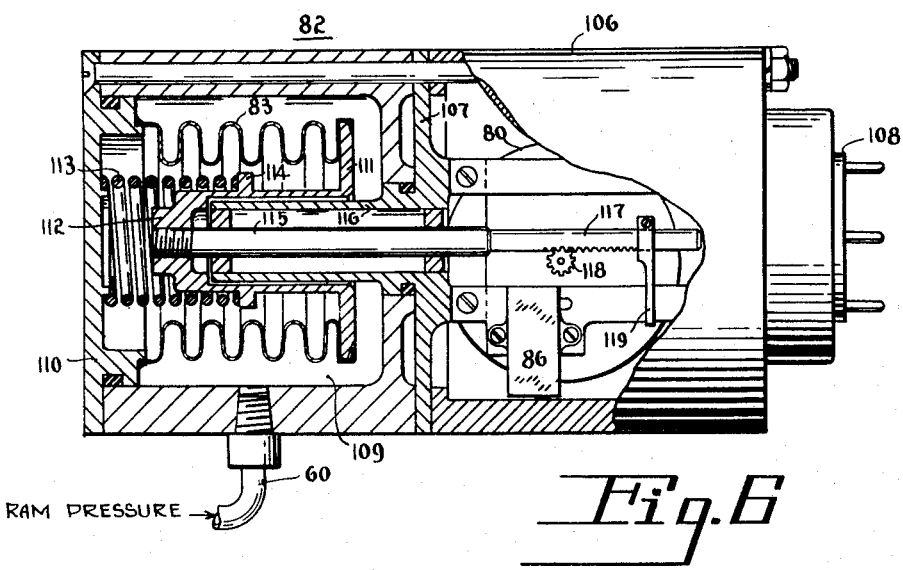
Fig. 6 is a view partly in section illustrating the biasing device operable by ram pressure used in the circuit of Fig. 4.

The specific devices for deriving the input voltage for the torquemeter amplifier 87 are shown by Figs. 5 and 6. Fig. 5 illustrates the torquemeter unit 54 generally indicated in Figs. 2 and 4 which comprises a casing 90 having at one end a fluid passage 91 for connection with the turbine torque sensing means and at the other end an electrical connection 92 for connecting the potentiometer 75 with the electric control circuit and voltage sources. The operating parts of the torquemeter comprise a piston 93 that is biased by a spring 94 against the torquemeter pressure. The spring 94 bears at one end on a fixed partition 95 in the casing 90 and at its opposite end on a collar 96 suitably secured to the piston 93. The partition 95 has a central sleeve-like bearing 97 through which the piston rod 98 extends into the potentiometer compartment of the casing. The pressure or working face of the piston 93 is sealed from this compartment by a metallic bellows 99, the right end of which is sealed to the partition 95 so as to surround the piston rod bearing and the left side sealed to the piston 93 as indicated. Consequently, the torquemeter oil pressure acting on the piston 93 tends to force the piston toward the right, thus operating the potentiometer 75. This is accomplished by means of a rack 100 forming an extension of the piston rod and a co-acting pinion 101 that is connected to the movable slider contact of the potentiometer, the latter being of conventional annular form as well known in the art. The rack is provided with a pair of "stop" members 102 and 103 for co-acting respectively with limit switches 104 and 105 hereinafter described. The electrical connections for the potentiometer and limit switches are by way of cable 55 extending from the electrical connection 92. It will thus be seen that for a predetermined low torque the switch 104 is actuated as indicated and that for a predetermined high torque the switch 105 is actuated.

The biasing device 82 of Fig. 6 is generally similar in construction to Fig. 5 with respect to the operation of potentiometer 80 and comprises a closed casing 106 having a partition 107 for dividing the casing into a pressure compartment and a potentiometer compartment, the later having within an end wall an electrical connector 108 for potentiometer and other connections. The pressure compartment 109 connects with the source of ram pressure through line 60 and encloses the evacuated metallic bellows 83, one end of the bellows being sealed to the end plate 110 of the pressure chamber and the other end of the bellows being sealed to an annular flange 111 of a cylinder-like piston 112. Thus, ram pressure tends to collapse the bellows and move the piston toward the left. The piston 112 is biased by a spring 113 bearing on the piston flange 114 in a direction to expand the bellows, i.e., toward the right, thus opposing the effect of ram pressure and tending to prevent collapse of the bellows. The piston 112 is connected to a piston rod 115 slidably mounted in the sleeve-like bearing 116 which also guides the piston and forms a part of the partition 107. As in the case of Fig. 5, the piston rod is provided with a rack extension 117 co-acting with a pinion 118 for operating the contact of potentiometer 80. A stop member 119 is connected to the rack for operating a switch 86 hereinafter described when the absolute ram pressure decreases to predetermined value, this value generally being coincident with high altitude.

Referring again to Fig. 4, the torquemeter voltage from amplifier 87 energizes a pair of branch circuits 121 and 122, the former being connected at 123 to the junction of two potentiometers 124 and 125 respectively. The potentiometers 124 and 125 represent power requirements, the former representing reverse thrust and the latter representing positive power or forward thrust. A slider contact 126 co-acts with both potentiometers and is mechanically connected as indicated to the power lever 69 so that the voltage derived at contact 126 for Beta control purposes depends on both the position of the power lever and the voltages energizing the potentiometer.

The power regime is controlled through the "condition" switch generally indicated at 127, this switch being structurally represented by Fig. 3. The switch is shown as having four horizontal rows of fixed contacts, each row cooperating with a respective slider contact connected to the condition lever 70, the top row being used for the governor control Fig. 10, the second and third rows for the power regime above referred to and the bottom row for the emergency temperature control, Fig. 9.

When reverse thrust is required the potentiometer 124 is energized from a fixed D.C. voltage source 129 only when the contact 128 of the condition switch is moved to the "take-off and land" position, this condition being the only one in which reverse thrust is necessary or desirable. Power control from the forward thrust potentiometer 125 is limited by the condition switch to "take-off and land" and "normal" operations.

The other operating conditions to which the condition lever can be adjusted are indicated in Figs. 3 and 4. Referring to Fig. 3, the condition lever 70 shown in cross-section is operable to a "cut-off" position wherein fuel and voltage sources are disconnected; a "start" position wherein fuel supply is limited and certain start control and governor circuits activated; a "ground-idle" position wherein other control circuits for controlling power and turbine r.p.m. are activated; a "normal operation" position representing cruising conditions for activating control circuits permitting limited flexibility in turbine r.p.m. upper range adjustment and full range power in forward thrust; and finally a "take-off and land" position for activating circuits permitting full-range power in both forward and reverse thrust and for holding maximum or rated turbine r.p.m., thus providing for maximum performance for critical operations such as combat, take-off and landing. The power lever is as indicated operable from a zero position to either full-power forward or reverse. The structural details of the control quadrant are not illustrated except in diagrammatic form since the invention is not limited to any specific form of switching device. The "feel" of the power and condition levers can be suitably adjusted by means of a friction varying element 68'.

Referring again to Fig. 4, the forward thrust potentiometer 125 is arranged to be alternatively connected, depending on flight conditions, to different sources of control voltage. The source of temperature error voltage from thermocouple 61 can be connected through an amplifier 130, conductor 131 and contact 132 of a discriminator relay 133 (shown de-energized) to the potentiometer terminal. The signal from amplifier 130 is zero for maximum allowable turbine temperature, and is negative and positive respectively for under and over temperatures. An alternative source of control voltage is the torquemeter voltage amplifier 87 that can be connected to the potentiometer through branch circuit 122 which includes a fixed D.C. voltage source 134 and contact 135 of the discriminator relay 133. The voltage at 134 is chosen so that the resultant torque signal applied to the potentiometer 125 is zero at maximum allowable torque, and is negative and positive respectively for under and over torques, thus establishing a reference value of zero volts in all cases for the maximum turbine limits. The deviation of this reference voltage, which is impressed on the terminals of potentiometer 125, in a positive or negative direction determines the control of blade angle.

The branch circuit 122 is also connected at junction 122' to an auxiliary circuit subject to control by the biasing unit 82 for controlling energization of the relay coil 136. Thus, the circuit 122 is connected to the input of a sign changing amplifier 137, the output of which in turn is connected to the input of a gear limit selector amplifier 138. This amplifier which functions as a discriminator is of the polarity-sensitive two-stage type conducting only on negative bias, and has additional inputs; namely, the thermocouple voltage on conductor 139 and a fixed positive voltage from source 140, the latter, however, being subject to the position of the bias switch 86. The fixed positive voltage is of such magnitude that it is effective, whenever connected to the amplifier, to offset any negative inputs and to make positive the resultant input signal, thus biasing the amplifier to cut-off.

The amplifier 137 by changing the polarity of the torque signal allows comparison with the thermocouple signal at the input of the discriminator amplifier 138. Thus, an undertemperature signal (negative) can be compared with an undertorque signal (positive after passing through sign change) and, if the torque signal magnitude is greater, indicating low torque, the resultant input signal at the discriminator is positive so that no current is passed. Relay 133 accordingly keeps the control responsive to temperature. In another case the torque may be at the maximum limit (zero voltage) and the temperature below maximum (negative), thus producing a resultant negative signal causing the amplifier to pass current. In the low-power range, excess torque can be anticipated since if torque increases more than temperature, the negative temperature signal predominates and the amplifier conducts. The output of amplifier 138 energizes the relay coil 136 through conductor 141 thereby transferring the control to torque as described.

At high altitude, for example, the bellows 83 of the biasing device 82 expands so as to close the switch 86, thus imposing a sufficiently large positive voltage from source 140 on the amplifier 138 to bias it under all conditions to cut-off so that the relay coil 136 is de-energized. The relay 133 is biased by spring 142 to close contact 132 and open contact 135 when the relay coil 136 is de-energized so that the temperature error voltage from amplifier 130 is impressed on potentiometer 125. The high altitude (or low airspeed) condition is evidenced by a predetermined low absolute ram pressure at which the maximum torque that can be possibly developed is well below the reduction gear safety limit according to known performance characteristics of the turbine. Under such conditions torque control at maximum power is unnecessary and the potentiometer 125 is, therefore, subject at its high power side to the temperature signal voltage.

During high torque operating conditions, i.e., when the switch 86 is open, the output of amplifier 138 is jointly controlled by the temperature and torque voltage signals from the amplifiers 130 and 137 respectively. Thus, for a resultant negative signal the relay 133 is energized by the amplifier output, the temperature signal is removed from potentiometer 125 and a modified torque signal voltage from amplifier 87 and voltage source 134 is impressed on the potentiometer through contact 135 of the relay. Accordingly, in the range of flight conditions wherein torque cannot possibly reach a critical value as at high altitude, temperature control is relied upon in the high-power range, whereas in the range of flight conditions, such as sea level, wherein torque can easily exceed the critical value at maximum or high turbine temperatures, the temperature control is over-ridden and shifted to torque.

As previously indicated, the voltage derived from the power potentiometer 125 at contact 126 represents the percentage demand of available or permissible power and the maximum available or permissible power or torque is determined by the energization of the potentiometer in accordance with torque, temperature and flight conditions.

This derived power voltage is integrated and used in combination with a non-integrated temperature voltage for controlling the blade angle motor circuit so as to match turbine load with the power setting. The combination of the integrated signal derived from torque and temperature when combined with the non-integrated temperature signal provides a stable system. The power voltage circuit from potentiometer contact 126 includes for "normal operation," the conductor 142, contacts 143 and 144 of the condition switch 127, conductor 145, amplifier input resistance 146, conductor 147, reset timer switch 148, conductor 149, integrating amplifier 150, amplifier input resistance 151 and input junction terminal 152 of the amplifier 150 for the blade angle motor. The non-integrated temperature voltage from thermocouple amplifier 130 is connected to the junction 152 through a conductor 154, sign changing amplifier 155, amplifier input resistance 156 and conductor 157. A follow-up or "answer" voltage derived from potentiometer 158 representing actual blade angle is also fed to the amplifier 153 at junction 152 for controlling the blade angle motor $M_1$, Figs. 4 and 7.

This control, presently described, is of the well-known follow-up type. The motor $M_1$ is operatively connected to potentiometer contact 160 as indicated for positioning it according to blade angle change along the potentiometer resistance 161 for deriving the aforesaid answer voltage. The potentiometer is energized by two D.C. voltage sources 162 and 163 having a common ground as indicated for dividing the potentiometer into positive and negative sections. The slider contact 160 is connected to the junction 152 by conductor 164 and amplifier input resistance 165. When the answer voltage balances the combined effect of the other input voltages the amplifier input is zero and there is no further change in blade angle. The blade angle motor is controlled by the output of amplifier 153 (which is conveniently of the D.C.—A.C. type having a final A.C. stage for facilitating motor control), through the output transformer 166, reset timer switch 167, conductor 168 and the associated motor control circuit of Fig. 7 presently described.

When blade angle decreases to a low value at low airspeed and low power demand, blade angle control due to torque becomes a bit ambiguous as previously mentioned, so that low blade angle limits are provided. Such a low pitch limit might be 20° while the craft is airborne, and 0° when it is on the ground. Control for blade angle limitation includes a potentiometer network 170 (Fig. 4) which has a source of D.C. voltage grounded at its positive terminal and a potentiometer 172 engaged at times by a slider 177 moved in accordance with actual blade angle and actuated by the pitch changing motor $M_1$.

During high positive blade angles, from 90° or feather to the low pitch limit of 20° as shown, the slider 177 is at 0 potential and exerts no control effect on the amplifiers 150 and 153. Below 20° positive blade angle and when the aircraft is airborne, the slider 177 engages the potentiometer 172 near the grounded potentiometer end 173; producing a negative voltage in opposition to the positive voltage tending to decrease blade angle, from the torquemeter amplifier 87. These voltages are combined in the lead 147 to the input of amplifier 150, the slider 177 being connected thereto through an input resistance 179 and a lead 178. If the voltage in the lead 147 is positive or negative, pitch will respectively decrease or increase and will settle out at a value close to 20° of blade angle when the positive and negative voltages balance out. In this mode of operation, the torquemeter voltage is small due to low torque values.

It is desirable to reduce the low pitch limit from 20° to a lesser value when the aircraft is on the ground to minimize propeller thrust, and to enable aerodynamic braking. To reduce the low pitch limit to, say, 0° of blade angle the potentiometer resistance 172 has a tap 173 which is connected through a variable resistor 175 and its slide 176 to ground, the slider being operated by a motor $M_2$ responsive in its operation to load on the aircraft landing gear. When the craft is airborne, the full resistor 175 is active, whereby the tap 173 is at a negative potential. Upon aircraft landing, motor $M_2$ is started and moves the slider 176 over a time interval of several seconds to reduce the effective resistance of resistor 175, and gradually reducing the potential at tap 173 to ground or zero potential.

This tap is located on the potentiometer at a position corresponding to 0° blade angle. This permits residual torque voltage to reduce blade angle from the flight low pitch limit of 20° to 0°, the slider 177 moving to the tap 173 as blade angle decreases. At any blade angle below 0°, the potentiometer 172 will produce a negative voltage counteracting the torque voltage, stabilizing blade angle at a value close to 0°.

When negative thrust is desired by movement of the power lever 69 to the left of contact 123 on potentiometer 125, the condition lever 70 being in the "take-off and land" position to connect the voltage source 129 across part 124 of the potentiometer, a positive pitch decreasing voltage is produced in lead 147. As blade angle becomes negative through the action of amplifiers 150 and 153 and motor $M_1$, slider 177 moves down potentiometer 172, producing a negative voltage at the slider. When this voltage reaches a value equal to the positive signal voltage from potentiometer 124, the signals cancel, input to amplifier 150 stops, and pitch change ceases at the desired negative pitch angle.

Upon a call for substantial power by the lever 69, positive blade angle is restored, and upon take-off, motor $M_2$ restores the variable resistor 175 to full effective resistance, re-establishing the flight low pitch limit at the 20° pitch angle level.

The input circuit of the integrating amplifier 150 and the output circuit of the blade angle motor amplifier 153 are controlled as above indicated by the contacts 148 and 167 respectively of the "reset timer" relay 180. This relay is arranged to be energized in any suitable manner by the reset timer, for example, whenever the latter is grounded through switch 181 of the relay 182 or contact 186 of the manual selector switch, Fig. 7, or switch 183 of the "voltage timer" relay 184. The reset timer is grounded by contacts 181 and 186 only when the blade control is on "manual." The voltage timer is set to delay application of plate voltage to the various amplifier tubes of the amplifiers 87, 150 and 153 until their filaments have reached operating temperature in order to index the integrating amplifier 150 and the time delay amplifier 87. At the instant when power from the source $E_{ac}$ is connected, or when power is restored following a momentary power interruption, the output of the integrating amplifier 150 is essentially zero, and without provision for indexing, the restoration of power would cause a large blade angle transient. The time delay means, therefore, is arranged to start its cycle at the end of the cathode warmup period, say 15 seconds, and it functions by effectively connecting through conductor 159 and switch 148 the sum of the inputs of amplifier 153 to the input of amplifier 150. During the indexing period for amplifiers 150 and 87, the blade angle motor $M_1$ remains de-energized.

As previously pointed out, the reset timer (which releases the relay 180 a predetermined time, such as one-half second, after its control is disconnected from ground) is continuously grounded by the contact 186 of the manual control switch 52', Fig. 7, except when the control is set on "automatic." In other words, the amplifiers 150 and 153 are in effect disabled during manual operation since torque and/or temperature control of motor $M_1$ is not used.

Figure 8:
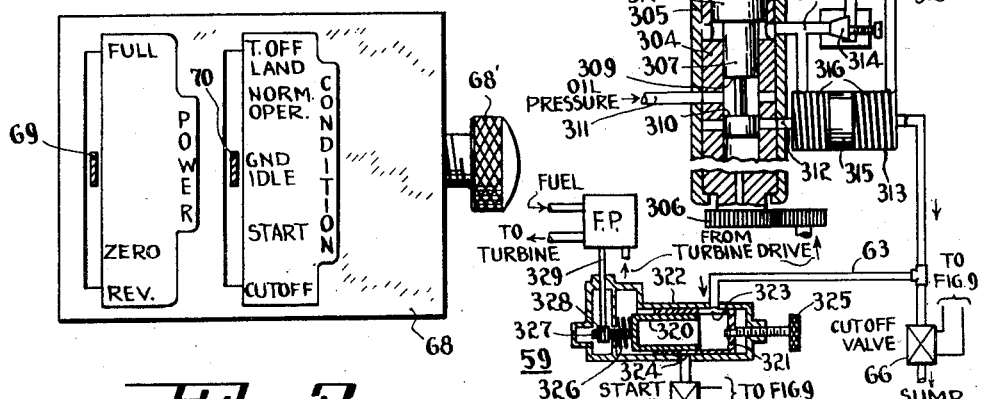
Fig. 8 is a view partly in section illustrating the propeller actuator device including the motor of Fig. 7 for effecting blade angle change.

The blade angle actuator unit 52 including a motor $M_1$ is generally illustrated by Fig. 8 and comprises a housing 190 for an automatic brake 191 and reduction gearing 192 interconnecting the motor $M_1$ and the output drive pinion 193, the latter being operatively connected in suitable manner to the blade angle changing mechanism.

The motor $M_1$ is housed in an extension 194 of the main casing and is directly connected to the automatic brake so as to release the brake when motor torque is applied. This type of brake which automatically sets when the motor is de-energized for preventing "coasting" is well-known. The reduction gearing 192 is also connected through take-off gearing 195 to gang-operated slider contacts of potentiometer structure indicated at 196 and including the potentiometer units 158 and 170 shown diagrammatically in Fig. 4. The potentiometers are electrically connected to the control system through the plug and cable connection 197.

Fig. 7 illustrates the specific control for the motor $M_1$ of Fig. 4, and also the control for motor $M_2$ for varying the blade angle reference value. The motor $M_1$ is of the alternating current two-phase type having a reference voltage winding 200 and a control voltage winding 201. The reference winding is energized through a conductor 203 connected to a suitable alternating current source $E_{ac}$. The control winding 201 is arranged to be energized either through the automatic control of Fig. 4 (conductor 168), or through a manual control as determined by the position of the manual blade angle selector switch 52'. Before tracing the control circuits of the motor $M_1$, it should be noted that the torquemeter limit switches 104 and 105 are connected so as to be normally in series in the automatic control circuit of the motor winding 201 when the torque is within normal range, i.e., the torquemeter stop members are in the intermediate position thereby permitting both switches to be biased towards each other so as to complete the automatic circuit. As shown, the torquemeter is de-energized and represents a stationary condition of the turbine. When the turbine is rotating, the same torquemeter position indicates excess negative torque.

When the torque is normal, the switch 104 is closed by its spring on contact 104' and the automatic control circuit is completed as follows: conductor 168, which transmits the blade angle signal voltage from the automatic control system of Fig. 4, fixed contact 204 and movable contact 205 of the manual switch 52', conductor 206, contacts 104' and 104 of the negative limit switch, conductor 207, contacts 105' and 105 of the positive limit switch and the control winding 201 of the blade angle motor $M_1$. Thus, with the voltage phase relationship of winding 200 fixed, it will be seen that reversal of phase in the control winding 201 is effective to cause rotation of motor $M_1$ in one direction or the other depending on whether the phase relationship of the current in the control winding represents increase or decrease of blade angle.

When the switch 52' is used for manual control of blade angle, the movable contact 205 cuts out the automatic circuit conductor 168 so that the motor $M_1$ is controlled directly from the voltage source $E_{ac}$ according to the pilot's demand for increase or decrease of blade angle.

As previously indicated, the manually operated blade angle selector switch 52' is normally set at the "automatic" position wherein the control system of Fig. 4 is connected through conductor 168 to the motor circuit of Fig. 7, and the slider contact 186 is ungrounded so that the reset timer is de-energized when the control is on "automatic." When, however, the manual switch 52' is moved from automatic to manual for effecting either increase or decrease in blade angle, the reset timer control relay 182, Figs. 4 and 7, is energized from the D.C. voltage source 208 to close contact 181 and thus ground the reset timer for resetting or indexing the integrating potentiometers so that they are in readiness for subsequent automatic operation.

The control circuit for the coil of relay 182 is adapted to be alternatively connected through conductor 209 or 210 to the manual switch contacts 211 or 212 respectively, depending on whether increase or decrease pitch is called for. Slider contact 205 together with conductor 206 and switches 104 and 105 complete the circuit to ground through the winding 201 of motor $M_1$.

The manually controlled circuits for operating the motor $M_1$ are connected to the opposite terminals of the secondary winding 213 of the transformer 214 which is energized from the source $E_{ac}$ previously referred to. The secondary winding 213 has a central tap 215 which is connected through the winding of relay 182 and the D.C. source 208 to ground. Accordingly, when the manual switch 52' is set at "increase pitch," the energizing circuit for coil 201 of the motor $M_1$ includes the lower terminal of the transformer secondary, conductor 209, switch contacts 211 and 205, conductor 206 and switches 104 and 105, thereby causing rotation of the motor $M_1$ in a direction to increase blade angle.

When the switch 52' is set for "decrease pitch" the circuit is completed from the upper or opposite polarity terminal of the transformer secondary through conductor 210, switch contacts 212 and 205 etc., to cause rotation of motor $M_1$ in opposite direction to decrease blade angle.

The torque meter limit switches 104 and 105 function as protective means in the following manner: Assuming first that the torque meter indicates excess positive torque, the switch 105 will be closed on contact 216. Thus the control is switched from automatic to the fixed voltage source from the upper terminal of the transformer secondary through conductor 217. This potential, as previously stated, rotates the motor $M_1$ in a direction to decrease blade angle. When the blade angle has decreased to a safe torque value, the torquemeter allows switch 105 to reclose on contact 105' so that automatic control is resumed. Similarly, if the negative torque limit is exceeded, switch 104 is closed as shown on contact 218 thus energizing the motor windings 201 through the series connected limit switches, conductor 219, switch 220 and conductor 221 to the lower terminal of the transformer secondary through conductor 209 so as to cause rotation of the motor in a direction to increase the blade angle, thereby reducing torque and restoring the control to automatic operation. The torque limit switches function as such and are independent of whether propeller is in positive or negative pitch.

The control of motor $M_2$ for changing the blade angle reference value for the follow-up control comprises the landing gear switch 73 and associated relay 222 arranged to control the switches 220 and 223. The landing gear switch 73 is connected by conductor 224 to the D.C. source 208 and is arranged to be operated in suitable manner by weight on the landing gear generally indicated at 225, so that the switch is closed when weight is on landing gear as indicated, and to be opened when the aircraft is airborne. The aircraft is here represented as grounded and the relay 222 is connected to D.C. source 208 through switch 73. In the de-energized position shown of relay 222 the windings 226 and 227 of the motor $M_2$ are energized from the primary winding of transformer 214 by way of conductor 228 so that the voltage on winding 226 is of fixed phase and the voltage on winding 227 is dephased by reason of the phase shifting shunt circuit including condenser 229, thus causing the motor $M_2$ to rotate in direction of maximum reference angle, i.e., 20 degrees. When the relay is energized thereby opening the branch circuit 230 and closing the branch circuit 231 the phase relationship is reversed so that motor $M_2$ rotates in the opposite direction toward minimum or zero reference angle.

In the de-energized position of relay 222, switch 220 simply completes the circuit for blade angle control during excess negative torque. When, however, the relay is energized the switch 220 closes the contacts 232 and 233 of a circuit shunting and in effect disabling the limit switch 104. It will thus be seen that when the aircraft is on the ground the automatic control can be connected to motor $M_1$ through either position of switch 104. This feature is essential for the starting operation since, as previously explained, the torquemeter is of the type indicating maximum negative torque when the turbine is not rotating.

If it is necessary to shut down the turbine during flight due to some emergency, the condition lever is moved to "cut-off" and the control circuit is placed in readiness for restarting the turbine by an "air start" switch 235 that is connected in shunt with the landing gear switch 73. Closing of the air start switch energizes the relay 222 and operates the associated switch 220 for disabling the limit switch 104 as previously described. This enables the motor $M_1$ to be energized for decreasing pitch, the propeller having previously been feathered due to the temperature signal voltage on the conductor 234 that is connected to the condition switch at "cut-off."

It will be noted that energization of relay 222 also causes operation of the reference angle motor M₂, but this operation is inconsequential since the reference angle potentiometer 170, Fig. 4, does not come into play at the airspeed at which the turbine is restarted. Thus control of blade angle is provided for a dead turbine start, either on the ground or in flight.

Figure 9:
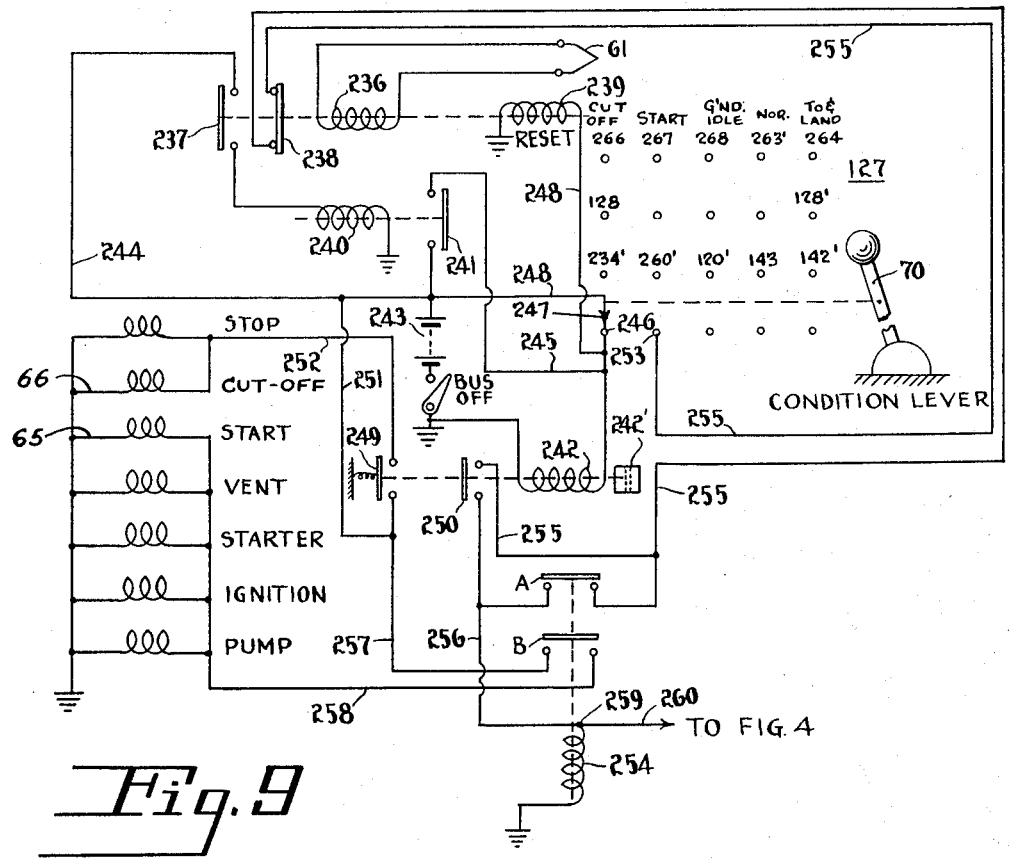
Fig. 9 is a circuit diagram illustrating the temperature protection system for controlling turbine operation.

Fig. 9 illustrates an emergency protection system in the case of dangerous turbine overtemperature. When an emergency of this character occurs, the turbine is automatically shut down and the pilot must move the condition lever to the cut-off position before attempting to restart the turbine.

Specifically, the thermocouples generally indicated at 61 energize through a circuit connected in shunt with the temperature signal circuit of Fig. 4 a sensitive relay 236 when the turbine temperature reaches a dangerously high value. The relay 236 controls a pair of switches 237 and 238 which are shown in the de-energized condition of the relay. The relay contacts when operated by the relay remain in the new position, regardless of the state of the relay coil until a reset coil 239 is energized for resetting the relay contacts. The relay switch 237 is operable to control an amplifying relay 242 from the D.C. voltage bus indicated at 243. In normal operation the bus switch indicated is closed. The amplifying relay 240 is also connected to the D.C. bus through conductor 244 and switch 237.

The conductor 245 interconnecting switch 241 and relay 242 is connected directly to contact 246 of the condition switch 127 so that when the condition lever is set at the cut-off position the slider contact 247, which is connected by conductor 248 to the D.C. bus, also completes an energizing circuit for the relay 242. Also, the reset coil 239 is connected by conductor 248 to condition switch contact 246 so that the reset coil is likewise energized when the condition lever is at cut-off.

Figure 10:
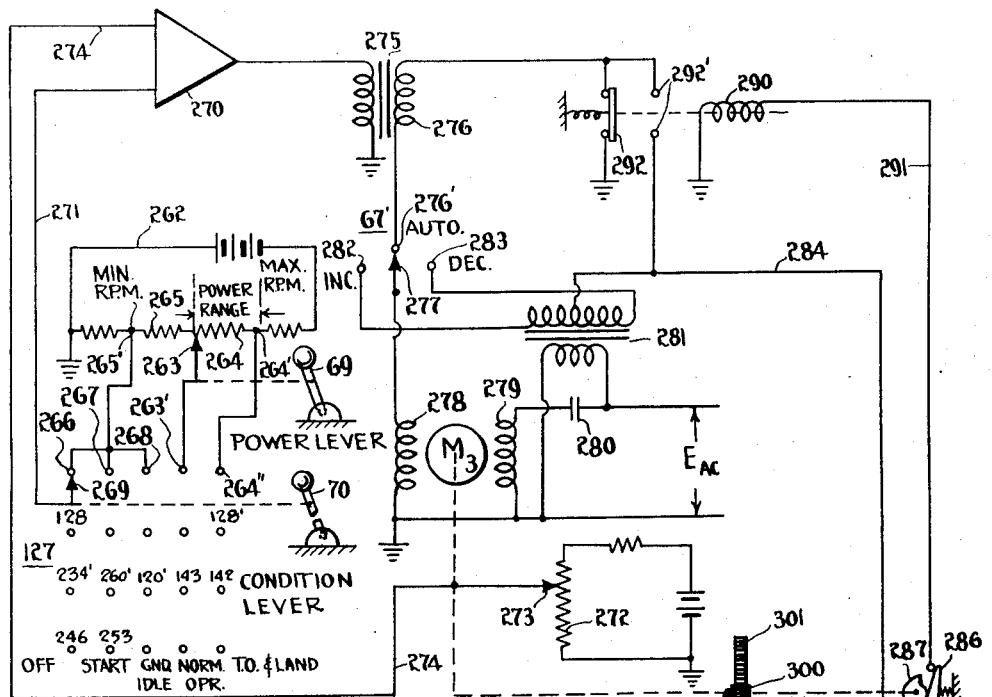
Fig. 10 is a combined circuit and schematic illustration of the governor and fuel supply system.

Energization of relay 242 in response to the emergency temperature signal causes closing of the relay switches 249 and 250, the former completing a circuit from the D.C. bus by way of conductors 251 and 252 for energizing the "stop" and "dump" valves, Figs. 2 and 10, for immediate shutting down of the turbine according to conventional practice.

The "stop" valve shuts off fuel, Fig. 10, and the "dump" valve clears the fuel lines according to well-known practice. Closing of switch 250 is a preliminary step in preparing the control circuit for restarting.

When the pilot is aware of turbine shut-down he immediately moves the condition lever, presumably from "normal" toward the cut-off position. As the slider contact engages the starter contact 253, there will be no pick-up of starting relay 254 (which controls the various turbine starting valves and apparatus) since conductor 255 is still open at the temperature signal switch 238. Thus premature starting of the turbine is avoided while the condition lever is being moved to cut-off. At the cut-off position the reset coil is energized through contacts 246 and 247 causing switches 237 and 238 to be restored to the normal positions shown. Since the turbine temperature has now decreased due to shutting off of fuel, the relay 236 will remain de-energized, until such time as a severe overtemperature recurs. At the same time D.C. voltage is now on the coil of relay 242 through contacts 247 and 246 so that switches 249 and 250 are held closed.

Thus, when the pilot decides to restart the turbine the slider contact 247 is moved to the start contact 253 thereby completing an energizing circuit for relay 254 from the D.C. bus through contacts 247 and 253, conductor 255, switch 238, switch 250 and conductor 256. The relay 242 is preferably of the slow drop-out type and may be temporarily held closed by a dashpot 242' so that the relay switch 250 remains closed a short time after relay de-energization in order to maintain an energizing circuit for relay 254. As soon as the relay 254 is energized its "A" switch closes, thereby shunting the switch 250 and functioning to complete a holding circuit for the relay 254. Closing of the "B" switch energizes through the D.C. bus, conductors 251, 257 and 258, the various start controls indicated ordinarily associated with the turbine for implementing the starting operation.

Assuming that the propeller has been feathered when the turbine is shut down, it is desirable at the beginning of the starting operation to bring the propeller to flat pitch. Since the relay 254 is energized during this period a signal voltage for this purpose can be taken from the relay circuit at point 259 by conductor 260 for use in the control system of Fig. 4. This voltage is impressed upon a "start" contact 260' of the condition switch 127 and is applied in the manner previously described to run the motor M₁ to flat pitch when the condition lever is on "start."

The condition lever is now assumed to be in the start position so that the relay 242 is de-energized and the switches 249 and 250 open so as not to block the starting operation. After starting, the condition lever is moved toward "normal" so that the relay 254 is de-energized, thus de-energizing the various starting controls. If the emergency overtemperature condition has cleared, the control system is in readiness for resuming normal operation as before. Fig. 10 illustrates the governor control circuit and the associated governor and fuel pump servo apparatus. The r.p.m. schedule, Figs. 15 and 16, is determined by correlating the power and condition levers so that the turbine rotates at a predetermined minimum speed, say 2500 r.p.m. for the "start" and "ground-idle" positions; at full-rated speed, say 7000 r.p.m., for "take-off and land"; and operates through a range of from approximately 6000 to 7000 r.p.m. at "normal operation" according to a corresponding gradation in power demand.

Assuming first that the r.p.m. control is set by switch 67' on "automatic," the r.p.m. potentiometer 262 controls the governor motor M₃ as follows: The potentiometer slider contact 263 which is connected to the condition switch contact 263' is operable by the power lever between the limits indicated for deriving a voltage from the potentiometer section 264 according to power demand. The potentiometer section 265 representing the r.p.m. range from 2500 to 6000 r.p.m. is connected at its low voltage terminal 265' to the condition switch at the "off," "start" and "ground-idle" contacts 266, 267 and 268 respectively.

When the condition slider contact 269 is in the "normal" position to engage contact 263', the voltage derived at the potentiometer contact 263 is fed to a D.C.-to-A.C. amplifier 270 by conductor 271. An "answer" voltage for follow-up control purposes is also fed to the amplifier from potentiometer 272, slider contact 273 and conductor 274. The slider contact 273 is positioned by the motor M₃ as indicated according to governor setting.

The output of amplifier 270 energizes the primary winding of transformer 275, the secondary winding 276 of which is connected (when on "automatic") through the r.p.m. selector contacts 276' and 277 to the control winding 278 of the two-phase motor M₃. The reference winding 279 of the motor is energized from the alternating current source E_ac through a dephasing condenser 280. Thus it is seen that motor M₃ is rotated according to the output of amplifier 270, i.e., until the answer voltage from potentiometer 272 neutralizes the r.p.m. voltage from potentiometer 262 at which point the amplifier output is zero, the motor is de-energized and the governor setting corresponds to the r.p.m. called for. In the same manner the motor M₃ is controlled to fix the governor setting at minimum r.p.m. when the condition lever contact 269 is on "off," "start" or "ground-idle" and at maximum r.p.m. when the lever is at "take-off and land," at which points corresponding voltages are derived from fixed taps 265' and 264' of the potentiometer 262.

When the r.p.m. control is to be on "manual" the contact 277 of switch 67' is moved from automatic to call for either increase or decrease of r.p.m. and the motor control winding 278 is energized by a fixed A.C. voltage from the source $E_{ac}$ through transformer 281 and contact 282 or 283 of the phase selector switch as the case may be.

The secondary winding of the transformer 281 has a center tap connected to ground through a circuit including conductor 284 and the D.C. voltage source 285 whereby the phase of the control voltage is reversed when the selector switch 67' calls for an opposite change in r.p.m.

It will be noted that when the r.p.m. control is on "manual," the D.C. source 285 is connected in series with the control winding 278 of the governor motor through conductor 284, the secondary of transformer 281 and the switch 67', thereby providing a field saturating current tending to make the motor sluggish. The same retarding means is also introduced in the motor circuit during "automatic" whenever turbine speed is below 6000 r.p.m. for example. This is accomplished by a switch 286 that is operated by a cam 287 in turn controlled by the motor $M_3$ so that the switch is closed by its biasing means whenever r.p.m. setting is below 6000, and vice versa. When this switch is closed, the relay 290 is energized from the D.C. source through conductor 291 so that the relay switch 292 opens the previously established automatic circuit at the ground connection and completes another shunt circuit at contacts 292' to connect the D.C. voltage source 285 in series with the automatic circuit through conductor 284.

The reason for avoiding, if possible, large changes in r.p.m. and for retarding the speed of the governor motor is that large amounts of kinetic energy must be added to the rotating part of the turbine as previously mentioned to increase its speed. Consequently, the acceleration of the turbine at a rate of several hundred r.p.m. per second requires a substantial increase of turbine temperature above its steady-state value. It is, therefore, necessary to restrict the rate at which the governor speed setting can be changed so that excessive amounts of fuel are not applied by the governor when a large speed error is suddenly introduced, such as when the condition lever is moved from the "ground idle" position to "take-off and land" position, i.e., from minimum to maximum r.p.m. The maximum rate of acceleration, it will be appreciated, depends on the turbine temperature "over-shoot" that can be tolerated.

Thus, in all cases where a comparatively large change in r.p.m. is or may be required, the governor motor is slowed down to a predetermined maximum rate so that a material time is required to adjust the governor setting through its full stroke between minimum and maximum r.p.m. A large change in governor setting at "start" is avoided by stabilizing the governor setting at minimum r.p.m. when the condition lever is set on the "off" contact 266. Thus, the governor motor is precluded from "floating" during an off condition to some higher r.p.m. setting, thus requiring considerable adjustment for proper starting r.p.m.

The governor per se is provided with conventional adjusting means comprising a speeder spring 295 seated between an adjustable abutment 296 and a speed responsive member such as a disc 297, the vertical position of which is controlled by the flyballs 298. Adjustment of the compression of the speeder spring for regulating the governor is effected as indicated by means of the governor motor $M_3$ that is operatively connected to the abutment 296 through gear reduction means including a pinion 300 and rack 301. The flyballs 298 are pivotally connected at 302 to a bracket structure 303 that constitutes an extension of a rotatable sleeve 304 suitably mounted in the cylindrical housing 305 and connected by means including gearing 306 to the turbine shaft as indicated. The sleeve 304, which is apertured as illustrated and concentrically disposed on the control valve spindle 307, therefore is rotated according to turbine speed so that the flyballs 298 which rotate with the sleeve are positioned, for example in case of turbine speed increase, to move the valve spindle upwardly against the tension of the speeder spring. When the turbine speed decreases the flyballs tend to collapse and the valve spindle is depressed by the speeder spring until the spring force and flyball centrifugal force balance each other. The flyball toe arms 308 rock on the lower surface of the disc 297 so that the effects of friction are minimized. It will be understood that the governor apparatus is specifically described only by way of example and that other governor mechanisms having suitable characteristics may be used in the practice of the present invention.

The governor is hydraulically controlled in response to flyball operation of the valve spindle for operating the fuel servo unit 59 in the following manner; the space between the two bottom lands 309 and 310 of the valve spindle is arranged to be in communication with a passage 311 connected to a source of servo oil under pressure for controlling application of servo oil pressure to the fuel servo piston 320 in conventional manner. In response to a turbine underspeed signal for example, the speeder spring 295 pushes the valve spindle downward a certain amount so as to open the passage 312 leading to the buffer cylinder 313 and to an adjustable needle valve 314. The resulting surge of oil deflects the buffer piston 315 which tends to be centered as illustrated as illustrated by springs 316 and produces a pressure differential proportional to the buffer spring deflection on the compensating piston 317 that is connected to the control valve spindle. This piston is in communication at its upper side with buffer cylinder 313 by passage 318 and at its lower side with passage 312 by passage 319. It is apparent that the pressure at opposite sides of the compensating piston 317 is equalized in the steady-state condition by reason of leakage of servo fluid through needle valve 314.

For the "increase-speed" signal in question the differential force above described urges the valve spindle in a direction tending to reclose the metering valve 310. The action is such that a quantity of oil is rapidly admitted to the buffer cylinder 313, this quantity being proportional to the off-speed. The needle valve 314 located in the bypass between the buffer piston and servo-piston is adjusted so that the flow of oil through the needle valve into the servo cylinder 322 is maintained as long as the r.p.m. error persists. As oil is admitted by pipe 63 into the servo cylinder, the servo piston 320 compresses a restoring spring 326 so that the servo cylinder oil pressure is proportional to the servo piston oil displacement. The rate of oil flow at the needle valve is approximately proportional to the buffer spring deflection and consequently to engine off-speed. Thus, the change of position of the servo piston due to this component of oil flow is proportional to the time integral of the off-speed. Therefore, since the fuel flow to the turbine is to correspond with the position of the spring restored servo piston 320, it will be noted that change in fuel flow is proportional to off-speed plus the time integral of the off-speed. This fulfills the conditions required for a "droop" stabilized governor, i.e., wherein the r.p.m. is allowed to droop slightly for a brief period following sudden torque changes.

The displacement of the fuel servo piston 320, constitutes the output signal of the governor and this signal is applied in suitable manner to operate a conventional variable displacement fuel pump ordinarily supplied with and driven by the turbine and generally indicated as F.P. As shown, the servo piston is operatively connected to the pump control rod 329 through a rack 327 and pinion 328 so that the fuel pump output is controlled in well-known manner by directional rotation of the control rod.

For the special conditions of "cut-off" and "start" the fuel servo is controlled by the solenoid valves 65 and 66, Figs. 2, 9 and 10, so as to shut off the fuel completely at "cut-off" and to limit the application of fuel at "start" in order to prevent overheating and damage to the turbine. The operation and circuits for these valves have been described previously in connection with the detailed description of Fig. 9. At cut-off the valve 66 simply by-passes the governor pressure to sump so that the servo piston is biased by its spring to the shut-off position wherein the fuel pump delivers no fuel. During "start" the valve 65 is open so that when the servo piston reaches a position representing a predetermined rate of fuel flow, the governor pressure is by-passed to sump through a lateral port that is uncovered by the piston. Thus, the servo piston can not be displaced beyond this point as long as the start valve is open. In order to adjust the fuel supply rate at "start" the servo piston is operable within a sleeve 321 that is in turn slidably adjustable within the servo casing 322 by means of a screw 325 attached to the sleeve. The adjustable sleeve has an elongated lateral port 323 for admitting the pressure oil to the piston and a lateral port 324 of suitable axial length for by-passing the pressure oil in accordance with predetermined initial movement of the servo piston. Thus, by adjusting the longitudinal position of the by-pass port 324, the starting fuel supply rate can be set at a predetermined value.

*Operation*

Assuming that the aircraft is airborne and that the condition lever, Fig. 4, is set at "normal" on contact 143, the pilot calls for additional forward thrust by advancing the power lever toward the right as previously described for operating the blade angle motor $M_1$ in a direction so as to vary the turbine load according to the power demand. The control is assumed to be on "automatic" so that the motor $M_1$ is responsive to the torque and temperature control signal from the potentiometer 125 and the integrator 150. It will be noted that the motor $M_1$ also is responsive to the non-integrated slowly responding thermocouple signal from the polarity changing amplifier 155. This latter signal, it will be recalled, is the stabilizing means for the temperature control and is necessarily strong since strong stabilizing means is required in the case of a thermal time lag of approximately three seconds. The control is made stable according to the invention by making the torque signal behave like the temperature signal, i.e., a response lag is deliberately introduced into the torquemeter signal circuit by the time-delay amplifier 87 as previously described so as to correspond to the thermocouple lag. This, in combination with proper torque control sensitivity, produces a stable control when the integrated signal with its time lag combines with the non-integrated temperature signal having the same time lag. It will be unnderstood that this response lag can, if desired, be introduced in the torquemeter hydraulic system through viscous damping, but because of variation in viscosity due to temperature changes, electronic means of the character illustrated is preferred.

As the pilot calls for more power, he knows in advance by the position of his power lever the amount of power he has in reserve. This is due to uniform percentage calibration of the power lever throughout its entire range and is obtained according to the invention by transforming the torque signal into one that is comparable with the thermocouple signal so as to compensate for different flight conditions. Although the relationship between shaft torque and burner temperature is essentially a linear one, Figs. 12 to 14, the slope of this characteristic varies widely with different flight conditions such as encountered at sea level and high altitude as indicated by Fig. 14. Thus, the torquemeter bias previously described introduced by means of the potentiometer 80 and the flight sensitive bellows 83 is used for adjusting the magnitude of the torque signal to the proper value. The evacuated bellows 83 has a deflection characteristic which when combined with the winding characteristic of potentiometer 80 produces the biasing effect desired.

This bias in performing its basic function of equalizing torque and temperature control sensitivities also serves to make linear the power lever calibration. Without the bias the percentage calibration of thrust would tend to be crowded toward the full-power position under some flight conditions, and toward the zero power position under others.

In the case where torque is the limiting factor at maximum power as represented by Fig. 13, the torquemeter bias reduces the effectiveness of the torque over-ride discriminator circuit in anticipating such a condition. Because of this, the bellows operated switch 86 prevents (by controlling the output of amplifier 138 and hence the operation of relay 136) control from transiently switching to the torque regime during increased power demand under flight conditions where torque is known to be well under the limiting value, as graphically illustrated by Fig. 12. Under such conditions the relay 136 is de-energized as shown so that with the torque signal on the left terminal 123 of the power potentiometer 125, and the temperature signal on the opposite terminal (through switch 132), pure torque control obtains at the zero power position of the power lever and pure temperature control at the full-power position, with joint torque and temperature control for intermediate power demand as previously described.

When the flight conditions are such that torque can be the limiting factor, as for example at sea level, bellows switch 86 is open and the discriminator amplifier 138 is jointly responsive to torque (Q) and temperature (T) input signals. The output of the amplifier now depends, as previously described, on the relative magnitudes and polarities of the torque and temperature signals, the reference value zero representing the maximum limit of both temperature and torque. Since the amplifier passes current only in response to a negative signal, it follows that it is biased to cut-off for maintaining temperature control in the following possible situations: in case of overtemperature (positive signal); in case of joint maximum temperature (zero signal) and any value of undertorque (positive signal); and in case of a larger undertorque signal (positive) than an undertemperature signal (negative). Conversely, the discriminator amplifier is biased to pass current for shifting to torque control as in case of joint undertemperature (negative) and overtorque (negative); in case of joint maximum temperature (zero) and overtorque (negative); and in case the undertemperature signal (negative) is greater than the undertorque signal (positive), thus providing for anticipatory control of excess torque.

Therefore, with the relay 136 de-energized as shown, the power potentiometer is connected through switch 132 to temperature control at high power demand so that the temperature limit is not exceeded when full power is demanded. Conversely, the relay 136 when energized by the amplifier output current switches the potentiometer 125 from the temperature signal to the torque signal through switch 135 so that the torque limit can not be exceeded when the power lever is set for full power.

Accordingly, as the position of the power lever is changed, or the voltage on the power potentiometer changes, the resulting derived voltage at slider contact 126 functions during normal operation to adjust blade angle in magnitude and in a direction corresponding respectively to the magnitude of the derived voltage and its polarity for increasing or decreasing turbine load as required.

The turbo propeller control system will now be described in connection with a complete flight, beginning with the aircraft grounded and the turbine shut down and ending with a landing using aero-dynamic braking. With the condition lever at "cut-off" no signal voltage is obtained from the power potentiometer, Fig. 4, the cut-off valve 66 is open, Fig. 10, so that turbine fuel supply is cut off, the propeller is at "feather," Fig. 4, and the governor is set for minimum r.p.m., Fig. 10. When the voltage supply bus is energized prior to starting, the emergency temperature system is reset by relay 239, Fig. 9.

When the condition lever is set at "start" the pitch control immediately functions in response to the signal from the circuit of Fig. 9 to bring the blades to flat pitch. In order to avoid overloading the starter, the propeller may be de-feathered by suitable manual means; or the starter circuit can be held open by an auxiliary switch until the propeller is at flat pitch. Engine starting is then automatically accomplished through the starting circuit of Fig. 9 by operation of conventional starter and ignition switches and associated apparatus (not shown) and the turbine is brought up to 2500 r.p.m., the minimum speed setting of the governor at which point the governor takes over control. Specifically, signal voltage from the starting circuit on conductor 260, Fig. 9, causes motor $M_1$ through the control circuits of Figs. 4 and 7, above described, to run the propeller to flat pitch. At the same time the turbine starting controls are operated by relay 254, Fig. 9, so that the turbine is started. As previously stated, the r.p.m. during starting is limited to 2500 r.p.m., Fig. 10, during which time the governor retarding circuit is closed by the cam-operated switch 286 so that the governor demand for fuel supply is not excessive; also, the fuel supply is limited by the start valve 65 which restricts the output of the fuel pump during starting.

As the pilot now moves the condition lever from "start" to "ground idle" for engine warm-up, the start controls are deenergized, Fig. 9, the governor remains set at minimum r.p.m. on contact 268, Fig. 10, and the circuit of the propeller actuator motor $M_1$ is energized by a voltage directly from the output of the torquemeter amplifier 87 (conductor 120 and contact 120', Fig. 4) for adjusting the propeller to approximately flat pitch. Actually, zero torque cannot be obtained at zero airspeed when the turbine is operating for obvious reasons so that the small torque signal is balanced by the pitch indicator signal from potentiometer 170 for maintaining blade angle at approximately flat pitch.

After the warm-up period, the pilot prepares for take-off by moving the condition lever from "ground idle" to the "take-off and land" position at contact 142', Fig. 4 and contact 264', Fig. 10, thus providing for maximum r.p.m. and automatic control of the blade angle motor. The governor control during this transition period insures gradual build-up of speed so as not to exceed turbine temperature limits. As grapically illustrated by Fig. 15, the pilot is now assured of maximum power at maximum r.p.m. for the critical take-off operation. He is also assured of having at his disposal, in case he needs aero-dynamic braking due to failure to become airborne, maximum reverse thrust (subject to the maximum rate of pitch change in running the propeller to reverse pitch) since the reverse thrust potentiometer 124 is now connected to the D.-C. voltage source 129.

When the aircraft becomes airborne and there is less need for maximum power on sudden demand, the pilot shifts the condition lever to "normal operation" which is the usual cruising position. In this position there is more flexibility in the power regime as graphically illustrated by Fig. 15, and the turbine operation is more efficient since the turbine speed is also increased through a limited range with increase in power demand as represented by the governor potentiometer resistance 264, Fig. 10. It should be noted that when the aircraft is airborne on "normal" schedule, the pilot cannot inadvertently or otherwise call for and get reverse thrust as this would most likely result in a crash.

If the pilot should call for reverse thrust after he becomes airborne and while in the "take-off" position, he will get as much reverse thrust as the negative and positive torque limit switches permit. As will be seen from Fig. 7, the landing gear switch 73 is now open, as is the air-start switch 235, so that relay 222 is de-energized thus closing switch 220.

Assuming an abnormal decrease of blade angle at cruising airspeed, this would produce high wind-milling torque, i.e., negative torque as illustrated by Fig. 11, causing in turn the torquemeter to move to the negative limit position to close limit switch 104 on contact 218. Thus, the blade angle control is switched from "automatic" to the fixed voltage circuit including conductors 221 and 209 and the transformer secondary 215 for causing the blade angle to increase until the torque is again normal, after which the control is switched by the torquemeter back to "automatic" at contacts 104 and 104'.

If excess positive torque is developed during flight due to failure of the electronic system or otherwise, the torquemeter over-rides completely the automatic control circuits of Fig. 4 and transfers by means of switch 105 the control from automatic to the fixed voltage circuit (of opposite phase) including the conductor 217 and transformer secondary 215 for causing decrease of blade angle until the torque decreases to a safe value, after which automatic operation may be resumed. It will, therefore, be noted that the torquemeter limit switches function to prevent the blade angle from running accidentally into full feather or reverse in case of failure of the electronic system. The pilot can in such cases switch to manual blade angle control and maintain flight.

In case of an emergency during flight calling for turbine shut-down such as described in connection Fig. 9, the blade angle is run to feather by shutting off fuel supply, i.e., moving the condition lever to "cut-off" and calling for some positive torque.

At "cut-off" the temperature signal is on condition switch 234', thus providing feathering control. Maximum torque demand will feather the propeller at the maximum rate consistent with the gear torque limit. Restarting of the turbine during flight may be done, assuming the emergency condition has cleared, by following the schedule previously described in Fig. 9, which is initiated by closing the air-start switch 235. The negative torque limit switch 104 is thus shunted so as to complete decrease blade angle signal to motor $M_1$ for de-feathering the propeller.

When the pilot is coming in for a landing, he again needs maximum power, both forward and reverse on immediate demand, so he sets the condition lever on "take-off and land." When the aircraft touches the run-way, its speed has greatly decreased and the blade angle follow-up control becomes necessary as illustrated by the torque reversal curves of Fig. 11, in order to prevent the propeller from prematurely running into reverse position. This control is initiated by the landing gear switch 75, Fig. 7, which is closed by weight on the landing gear so as to energize relay 222, thus closing the circuit of motor $M_2$ through conductor 231. The motor then operates the reference blade angle potentiometer 175 in the manner previously described for gradually shifting blade angle from +20° to flat pitch. The pilot can obtain reverse thrust for aero-dynamic braking as previously described simply by moving the power lever into the reverse range for deriving a blade angle control voltage from potentiometer 124, Fig. 4; thus full aero-dynamic braking on the ground is always possible in the "take-off and land" position.

The follow-up reverse blade angle control by means of potentiometer 170 is indicated as effective to the point at which maximum negative thrust well within the safe torque and temperature rating of the turbine is developed, in this case at —22°. When the aircraft comes to a stop, the pilot has reduced the reverse thrust to zero, and the blade is now approximately at flat pitch. The turbine can now be shut down and the propeller feathered as previously described by moving the condition lever to "cut-off" and calling for some positive thrust.

It should be understood that the invention is not limited to specific details of construction and arrangement thereof herein illustrated, and that changes and modifications may occur to one skilled in the art without departing from the spirit of the invention.

What is claimed is:

1. In a control system for a gas turbine and variable pitch aircraft propeller combination having means responsive to a variation in turbine shaft torque, means for adjusting the blade angle of said propeller at low airspeeds comprising control means adjustable to a desired power setting and operatively connected to said torque responsive means for controlling the blade angle adjusting means according to torque on minimum power demand, means actuated by a grounded condition of the aircraft, and means operatively connected with and jointly operated by said grounding means and said control means for replacing torque control of blade angle for maintaining said blade angle at substantially zero thrust position.

2. In a control system for a gas turbine and variable pitch aircraft propeller combination comprising means responsive to a variation in turbine shaft torque, means controlled by the aforesaid torque responsive means for adjusting the blade angle of said propeller in accordance with minimum power demand for obtaining substantially zero thrust, blade angle follow-up means operable to a predetermined minimum blade angle for replacing torque control of blade angle for maintaining zero thrust at low airspeeds, means actuated by a grounded condition of the aircraft operatively connected with said follow-up means for maintaining said blade angle at substantially zero thrust position during deceleration of the aircraft.

3. A control system for a gas turbine and variable pitch aircraft propeller combination for regulating blade angle at landing speeds of aircraft comprising means responsive to variation in turbine shaft torque, operating means controlled by said torque responsive means during normal flight in accordance with minimum power demand for adjusting blade angle to the zero thrust position, blade angle follow-up means operable to a predetermined minimum blade angle representing zero thrust at a reduced air speed for over-riding the torque control and transferring the blade angle control from said torque responsive means to the blade angle follow-up control, and means operable by landing operation of the aircraft operatively connected to the follow-up control for modifying said blade angle follow-up control by decreasing the aforesaid minimum angle.

4. A control system for a gas turbine and variable pitch propeller combination for regulating blade angle at landing speeds of aircraft comprising means responsive to variation in turbine shaft torque, operating means controlled by said torque responsive means in accordance with minimum power demand for adjusting the blade angle, blade angle follow-up means operable in response to a predetermined low reference angle representing zero thrust at a reduced air speed for transferring the blade angle control from said torque responsive means to blade angle follow-up control, and means operable by a landing operation of the aircraft operatively connected to the follow-up means for modifying the follow-up means to gradually decrease the aforesaid reference to compensate for deceleration of the aircraft.

5. In a control system for a gas turbine and variable pitch aircraft propeller combination for regulating blade angle at low landing speeds, comprising means responsive to a variation in turbine shaft torque, operating means controlled by said torque responsive means in accordance with minimum power demand for adjusting the blade angle, blade angle follow-up means including a potentiometer operable in response to a predetermined low blade angle representing zero thrust at a low air speed for deriving a follow-up voltage, said voltage over-riding the control of said blade operating means by said torque responsive means thereby preventing reversal of blade angle in response to torque, and means operable by a landing operation of the aircraft operatively connected with said follow-up means for modifying the operation of said potentiometer for decreasing the aforesaid reference angle to compensate for deceleration of the aircraft.

6. In a control system for a gas turbine and variable pitch aircraft propeller combination, a blade angle control motor, means for automatically controlling said motor according to turbine power demand, means responsive to turbine shaft negative and positive torque, limit switches operable thereby for transferring the control of said motor from automatic to corrective control circuits in case of excessive negative or positive turbine torque, said torque responsive means also indicating excess negative torque for a stall condition of the turbine, and relay means controlled in response to either a grounded condition of the aircraft or in response to operation of "air start" control means for connecting said motor to automatic control during turbine restarting.

References Cited in the file of this patent

UNITED STATES PATENTS

| | | |
|---|---|---|
| 2,095,991 | Lysholm | Oct. 19, 1937 |
| 2,402,065 | Martin | June 11, 1946 |
| 2,498,939 | Bobier | Feb. 28, 1950 |
| 2,594,927 | Holt | Aug. 29, 1952 |